(12) United States Patent
Usseglio Nanot et al.

(10) Patent No.: US 10,563,841 B2
(45) Date of Patent: Feb. 18, 2020

(54) TUNABILITY IN SUN-LIGHT IMITATING LIGHTING SYSTEMS

(71) Applicant: COELUX S.R.L., Lomazzo (CO) (IT)

(72) Inventors: Sandro Usseglio Nanot, Giaveno (IT); Simone Bonanomi, Muggio (IT)

(73) Assignee: CoeLux S.r.l., Lomazzo (IT)

( * ) Notice: Subject to any disclaimer, the term of this patent is extended or adjusted under 35 U.S.C. 154(b) by 0 days.

(21) Appl. No.: 16/349,031

(22) PCT Filed: Mar. 24, 2017

(86) PCT No.: PCT/EP2017/057062
§ 371 (c)(1),
(2) Date: May 10, 2019

(87) PCT Pub. No.: WO2018/091150
PCT Pub. Date: May 24, 2018

(65) Prior Publication Data
US 2019/0285247 A1 Sep. 19, 2019

(30) Foreign Application Priority Data
Nov. 19, 2016 (WO) ................. PCT/EP2016/001945

(51) Int. Cl.
*F21V 14/00* (2018.01)
*F21V 9/02* (2018.01)
(Continued)

(52) U.S. Cl.
CPC .......... *F21V 9/02* (2013.01); *B32B 17/10036* (2013.01); *B32B 17/10504* (2013.01); *F21V 7/0008* (2013.01); *G02B 5/0236* (2013.01); *G02B 5/0242* (2013.01); *G02B 5/0257* (2013.01)

(58) Field of Classification Search
CPC ...... B82Y 20/00; F21W 2121/00; F21V 9/02; F21V 7/0008; G02B 5/0242
See application file for complete search history.

(56) References Cited

U.S. PATENT DOCUMENTS 8,430,548 B1 4/2013 Kelly et al.
2009/0244433 A1 10/2009 Ota
(Continued)

FOREIGN PATENT DOCUMENTS

WO 2005101445 A1 10/2005
WO 2009156347 A1 12/2009
(Continued)

OTHER PUBLICATIONS

Jon Andreassen, European International Searching Authority, International Search Report and Written Opinion, corresponding PCT Application No. PCT/EP2017/057062, dated Jul. 25, 2017, 13 pages total.
(Continued)

*Primary Examiner* — Andrew J Coughlin
(74) *Attorney, Agent, or Firm* — DiBerardino McGovern IP Group LLC

(57) ABSTRACT

A diffuser unit (9) for providing a chromatically tunable transmitted light (33) by scattering of light that is incident on the diffuser unit (9) by illumination with white light (89) comprises a scattering layer (17) with a plurality of nanoscale scattering elements (19, 63) and a host material (21, 61) separating the nanoscale scattering elements (19, 63). The diffuser unit (9) further comprises a pair of areal electrical contacts (23') for providing an electric field (27) and at least one of the areal electrical contacts (23') is configured to be transparent in the visible wavelength range. The scattering layer (17) has a wavelength dependent ensemble light scattering cross-section amount within the visible wavelength range that depends on a relative refractive index between the nanoscale scattering elements (19, 63) and the host material (21, 61) associated to an illumination direction, and an effective size of the nanoscale scattering elements (19, 63) associated to the illumination direction. The scattering layer (17) is configured to be adaptable in the ensemble light scattering cross-section amount by varying the relative refractive index and/or the effective size of the nanoscale scattering elements (19, 63), thereby providing a changeability in the spectrum of the transmitted light (33).

21 Claims, 15 Drawing Sheets

(51) Int. Cl.
  *B32B 17/10* (2006.01)
  *F21V 7/00* (2006.01)
  *G02B 5/02* (2006.01)

(56) References Cited

U.S. PATENT DOCUMENTS

| | | |
|---|---|---|
| 2012/0262778 A1 | 10/2012 | Hashimura et al. |
| 2014/0133125 A1 | 5/2014 | Di Trapani et al. |
| 2015/0277164 A1 | 10/2015 | Nagase et al. |
| 2018/0013099 A1* | 1/2018 | Harkema ............. G02B 5/0242 |

FOREIGN PATENT DOCUMENTS

| | | |
|---|---|---|
| WO | 2009156348 A1 | 12/2009 |
| WO | 2014075721 A1 | 5/2014 |
| WO | 2014076656 A1 | 5/2014 |
| WO | 2015135560 A1 | 9/2015 |
| WO | 2015172821 A1 | 11/2015 |
| WO | 2017036502 A1 | 3/2017 |
| WO | 2017084756 A1 | 5/2017 |
| WO | 2018045469 A1 | 3/2018 |
| WO | 2018091150 A1 | 5/2018 |

OTHER PUBLICATIONS

Jon Andreassen, European International Examining Authority, International Preliminary Report on Patentability, corresponding PCT Application No. PCT/EP2017/057062, dated Mar. 12, 2019, 27 pages total.

* cited by examiner

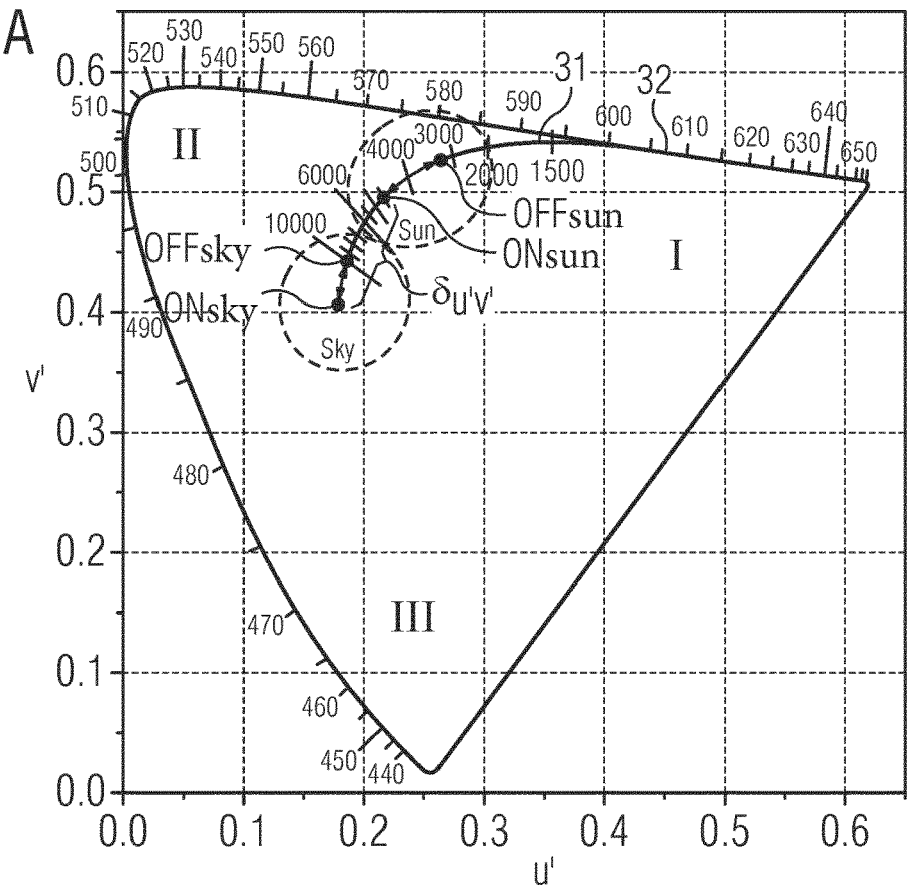
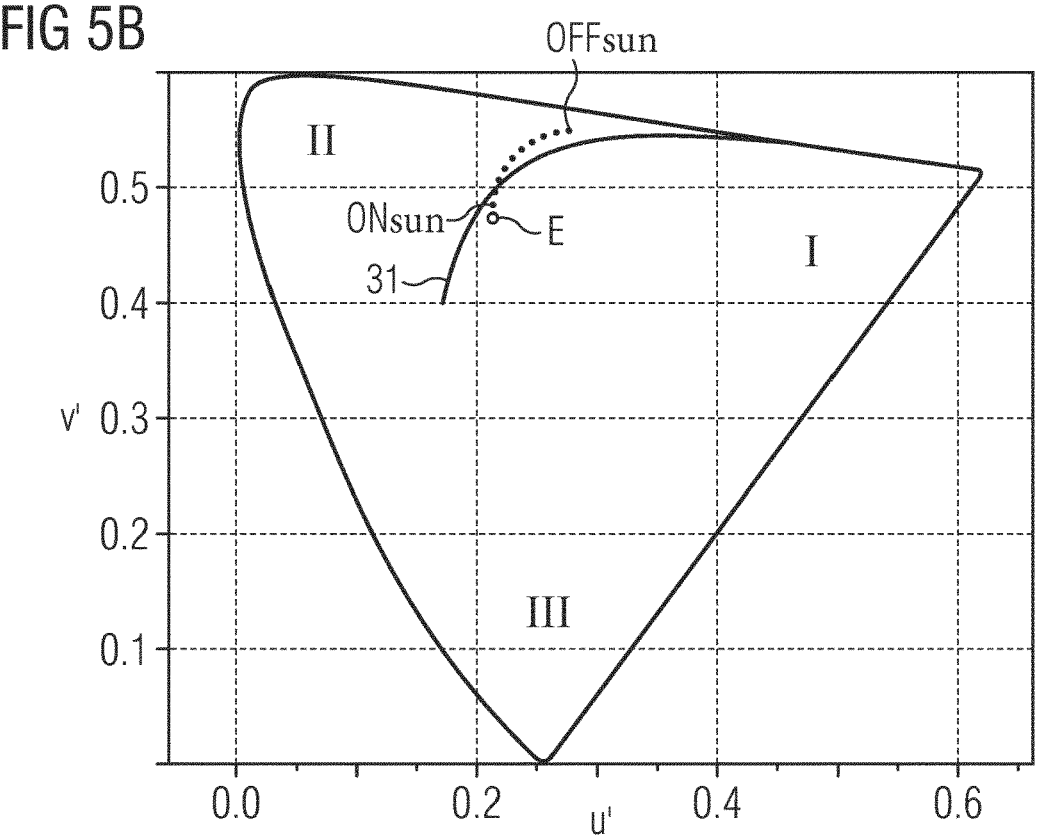

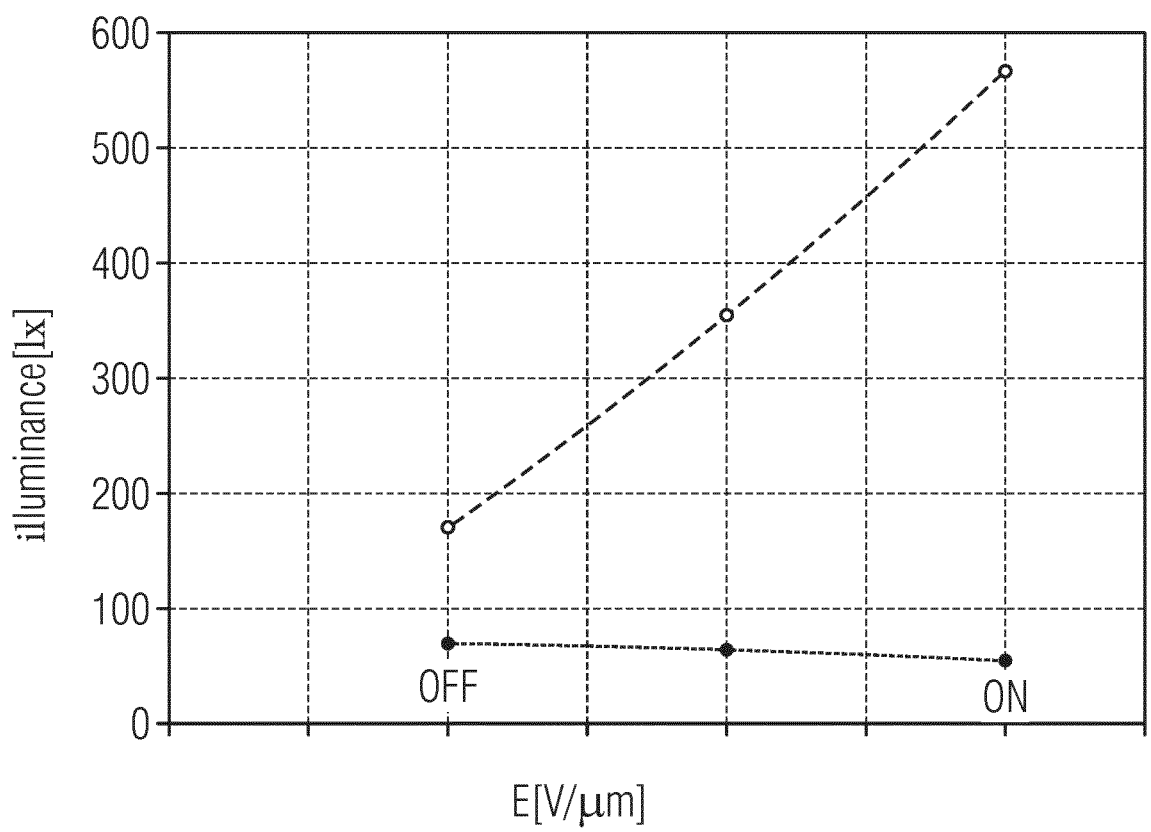

US 10,563,841 B2

TUNABILITY IN SUN-LIGHT IMITATING LIGHTING SYSTEMS

TECHNICAL FIELD

The present disclosure relates generally to lighting systems, in particular to lighting systems for imitating natural sunlight illumination. Moreover, the present disclosure relates generally to diffuser units and in particular to lighting systems with diffuser units being based on Rayleigh-like scattering.

BACKGROUND

Artificial lighting systems for closed environments often aim at improving the visual comfort experienced by users. For example, lighting units are known for simulating natural lighting, specifically sunlight illumination, that provide dichroic light to be emitted from a dichroic light exiting surface, where the dichroic light comprises a directional light portion of direct light having a first (lower) correlated color temperature (CCT) and a diffused light portion of diffused light having a second (larger) CCT.

Exemplary embodiments of such lighting systems using, for example, Rayleigh-like diffusing layers are disclosed in several applications such as WO 2009/156347 A1, WO 2009/156348 A1, WO 2014/076656 A1, and WO 2015/172821 A1 filed by the same applicants. The therein disclosed lighting systems use, for example, a light source producing visible light, and a panel containing nanoparticles used in transmission or reflection. During operation of those lighting systems, the panel receives the light from the light source and acts as a so-called Rayleigh diffuser, namely it diffuses incident light similarly to the earth atmosphere in clear-sky conditions.

In further embodiments such as disclosed in WO 2014/075721 A1, the unpublished international patent application PCT/EP2015/077169, and the not yet published international patent application PCT/EP2015/069790 filed by the same applicants on 28 Aug. 2016, the concepts of direct light with lower CCT and diffused light with larger CCT are implemented exemplarily in a linearly extending and in a compact configuration of lighting systems.

As mentioned, the implementations referred to above use nanoparticles that interact with light, due to their nanosize, in the Rayleigh (or Rayleigh-like) scattering regime and are embedded in a host material (surrounding matrix). It is well known from fundaments of light-scattering that transparent nanoparticles having different refraction index with respect to the matrix, and having sizes (significantly) smaller than visible wavelength, will preferentially scatter the blue part of the spectrum, and transmit the red part. Specifically, the single particle scattering cross-section is given by $$\sigma(\lambda) = \frac{2}{3}\pi^5 \frac{D^6}{n_h^2 \lambda^4}\left(\frac{m^2-1}{m^2+2}\right)^2$$

and an ensemble scattering cross-section amount is given by $$\sigma(\lambda)_{tot} = N \cdot \sigma(\lambda),$$

with N being the number of nanoparticles per unit area (see below).

The optical parameters of the scattering are defined by the size and refractive index of the nanoparticles as well as the number of particles distributed in, for example, a transparent matrix and by the refractive index of that matrix. For nanoparticles, the Rayleigh scattering process depends on three parameters D, m, and N as summarized in the following:

D relates to the size d of the nanoparticles. Specifically, an effective particle diameter $D=d\,n_h$ is considered, where d [meter] is the average particle size over the particles distribution in the case of spherical particles, and as the average thickness of the particles in an assigned propagation direction in the case of non-spherical particles. While the wavelength-dependence of the scattering efficiency per single particle approaches the $\lambda^{-4}$ Rayleigh-limit law for particle sizes smaller or about equal to 1/10 of the wavelength $\lambda$, a respective acceptable optical effect may be reached already in the above range for the size of the nanoparticles, often referred to as Rayleigh-like scattering. On the other side, the scattering efficiency per single particle, proportional to $D^6$, decreases with decreasing particle size, thereby making the use of too small particles inconvenient and requiring a high number of particles in the propagation direction, which in turn may be limited by an achievable filling-fraction.

m relates to the index mismatch of the nanoparticles and the matrix. Specifically, the chromatic effect is based on nanoparticles having a refractive index that is different from the refractive index of the embedding matrix. To scatter, the nanoparticles have a real refractive index $n_p$ sufficiently different from the refractive index $n_h$ of the host material in order to allow light scattering to take place. E.g., the above mentioned prior art systems use a specific solid particle within a specific host material, thereby setting the scattering condition for a fixed ratio $$m = \frac{n_p}{n_h}$$

between the particle and host medium refractive indexes. m is referred to as the relative index of refraction.

N relates to the number of nanoparticles involved in the scattering. Specifically, the chromatic effect is based on the number of nanoparticles per unit area seen by the impinging light propagating in a given direction as well as the volume-filling-fraction f. Specifically, the chromatic effect is based on the number N of nanoparticles per unit area that are e.g. embedded in the chromatic diffusive layer.

Herein, a system and a method for Rayleigh-like scattering is disclosed that can be used, in particular, for implementation in a lighting system that imitates the sun-sky illumination for varying conditions.

Thus, the present disclosure is directed, at least in part, to improving or overcoming one or more aspects of prior systems.

SUMMARY OF THE DISCLOSURE

In a first aspect, the present disclosure is directed to a diffuser unit for providing a chromatically tunable transmitted light by scattering of light that is incident on the diffuser unit by illumination with white light. The diffuser unit comprises a scattering layer with a plurality of nanoscale scattering elements and a host material separating the nanoscale scattering elements, and a pair of areal electrical contacts for providing an electric field, in particular for interacting with the nanoscale scattering elements and/or the host material, wherein the areal electrical contacts extend on opposite faces of the scattering layer and at least one of the areal electrical contacts is configured to be transparent in the visible wavelength range. The scattering layer has a wavelength dependent light scattering cross-section within the visible wavelength range that depends on a relative refractive index between the nanoscale scattering elements and the host material associated to an illumination direction (e.g., in a direction within the usual implementation in lighting systems such as about perpendicular to the scattering layer or about under an angle such as 30°, 45°, 60°), and an effective size of the nanoscale scattering elements associated to the illumination direction. The scattering layer is configured to be adaptable in the light scattering cross-section by varying the relative refractive index and/or the effective size of the nanoscale scattering elements, thereby providing a changeability in the spectrum of the transmitted light.

Another aspect refers to a diffuser unit for providing a chromatically tunable scattering interaction onto impinging white light. The diffuser unit comprises a polymer dispersed liquid crystal layer with liquid crystals embedded in a host polymer, wherein the liquid crystals form nanodroplets, are separated by the polymer, and have an anisotropy in the index of refraction; and a pair of areal electrical contacts for providing an electric field for interacting with the liquid crystals within the nanodroplets, wherein the areal electrical contacts extend on opposite faces of the scattering layer and at least one of the areal electrical contacts is configured to be transparent in the visible wavelength range.

Another aspect refers to a diffuser unit for providing a chromatically tunable scattering interaction onto impinging white light. The diffuser unit comprises a scattering layer with a liquid crystal layer with liquid crystals having an anisotropy in the index of refraction, and a plurality of nanoscale scattering elements embedded in the liquid crystal layer and having a refractive index. The diffuser unit comprises further a pair of areal electrical contacts for providing an electric field for interacting with the liquid crystals within the liquid crystal layer, wherein the areal electrical contacts extend on opposite faces of the scattering layer and at least one of the areal electrical contacts is configured to be transparent in the visible wavelength range and a pair of cover sheets each carrying one of the areal electrical contacts and delimiting the liquid crystal layer.

Another aspect refers to a diffuser unit for providing a chromatically tunable scattering interaction onto impinging white light with a plurality of nanoscale scattering elements that are geometrically asymmetric, in particular rod-like/elongated, in shape and provide an, in particular induced, dipole moment in the presence of an electric field, and a liquid-like host material layer, wherein the liquid-like host material differs in the refractive index from the refractive index of the nanoscale scattering elements, separates the nanoscale scattering elements, and allows reorientation of the nanoscale scattering element. The diffuser unit further comprises a pair of areal electrical contacts for providing an electric field for interacting with the nanoscale scattering elements within the liquid-like host material layer, wherein the areal electrical contacts extend on opposite faces of the liquid-like host material layer and at least one of the areal electrical contacts is configured to be transparent in the visible wavelength range, and a pair of cover sheets each carrying one of the areal electrical contacts and delimiting the liquid-like host material layer.

Another aspect refers to a diffuser unit for providing a chromatically tunable transmitted light by scattering of light that is incident on the diffuser unit by illumination with white light. The diffuser unit comprises a scattering layer with a polymeric dispersed liquid crystal layer with liquid crystals being delimited in nanodroplets with a droplet diameter d in the range from about 10 nm to about 500 nm such as in the range from about 20 nm to about 400 nm such as in the range from about 30 nm to about 300 nm, liquid crystals having an anisotropy in the range of $0.02 \leq |n_e - n_o| \leq 0.5$, and a polymeric host material separating the nanoscale scattering elements and having a host refractive index $n_h$ in the range from 1 to 3 such as in the range from 1.2 to 2.2 such as in the range from 1.25 to 1.75. The maximizing relative refractive index $\tilde{m}$ is the one among the two values $$\frac{n_0}{n_h} \text{ and } \frac{n_e}{n_h},$$

which maximizes the function $$\left(\frac{m^2 - 1}{m^2 + 2}\right)^2.$$

The droplet size, the host refractive index, and the maximizing relative refractive index, and a constant c define the minimum number N of nanodroplets per unit area of the scattering layer, in particular of the surface of the scattering layer, by $$N = c \cdot \frac{n_h^2}{D^6} \left(\frac{\tilde{m}^2 + 2}{\tilde{m}^2 - 1}\right)^2,$$

for the constant c being $2.918 \times 10^7$ nm$^4$ or larger, in particular $8.32 \times 10^7$ nm$^4$ or larger, such as $1.6175 \times 10^8$ nm$^4$ or larger. (The number of nanodroplets per unit area of the scattering layer being at least that value N.)

Another aspect refers to a diffuser unit for providing a chromatically tunable transmitted light by scattering of light that is incident on the diffuser unit by illumination with white light. The diffuser unit comprises a scattering layer with static scattering centers (nanoparticles) embedded in a liquid crystal-based host material with the static scattering centers having a diameter d in the range from about 10 nm to about 500 nm such as in the range from about 20 nm to about 400 nm such as in the range from about 30 urn to about 300 nm, a refractive index $\eta_p$ of the static scattering centers being in the range from 1.1 to 3.2 such as in the range from 1.2 to 3 such as in the range from 1.3 to 2.8, and a maximizing refractive index of the liquid crystal host material $\tilde{n_h}$ having a value between $n_o$ and $n_e$ wherein the liquid crystals have an anisotropy in the range of $0.02 \leq |n_e - n_o| \leq 0.5$. $\tilde{n_h}$ is the value, which maximizes the function $$\frac{1}{n_h^2}\left(\frac{m^2 - 1}{m^2 + 2}\right)^2.$$

The scattering center size (e.g. droplet size), the maximizing host refractive index, the static scattering centers refractive index, and a constant c define the minimum number N of static scattering centers per unit area of the scattering layer, in particular of the surface of the scattering layer, by $$N = c \cdot \frac{\widetilde{n_h}^2}{\tilde{D}^6} \left( \frac{\hat{m}^2 + 2}{\hat{m}^2 - 1} \right)^2$$

wherein $$\tilde{m} = \frac{n_p}{\overline{n_h}},$$

for the constant c being 2.918×10⁷ nm⁴ or larger, in particular 832×10⁷ nm⁴ or larger, such as 1.6175×10⁸ nm⁴ or larger. (The number of static scattering centers per unit area of the scattering layer being at least that value N.)

Another aspect refers to a diffuser unit for providing a chromatically tunable transmitted light by scattering of light that is incident on the diffuser unit by illumination with white light. The diffuser unit comprises a scattering layer with nanoscale scattering elements having an anisotropy in the geometric shape and being embedded in a host material, wherein an effective upper diameter $\tilde{D}=\tilde{d}\cdot n_h$, where $\tilde{d}$ is the long axis of the anisotropic shaped nanoscale scattering elements and is in the range from about 10 nm to about 500 nm such as in the range from about 20 nm to about 400 nm such as in the range from about 30 nm to about 300 nm, an aspect ratio (ratio between long and short axis) is larger than 1.2 such as 2 such as 5 such as 10 such as 23 or 25 or more, a refractive index of the anisotropic shaped nanoscale scattering elements is in the range from 1.2 to 3.2 such as in the range from 1.3 to 3 such as in the range from 1.4 to 2.8, and a refractive index of the host material is in the range from 1 to 3 such as in the range from 1.2 to 2.2 such as in the range from 1.25 to 1.75. The parameters anisotropy/maximum size for long axis, host refractive index, relative refractive index, and a constant c define the minimum number N of anisotropic shaped nanoscale scattering elements per unit area of the scattering layer by $$N = c \cdot \frac{n_h^2}{\tilde{D}^6} \left( \frac{m^2 + 2}{m^2 - 1} \right)^2,$$

for the constant c being 2.918×10⁷ nm⁴ or larger, in particular 8.32×10⁷ nm⁴ or larger, such as 1.6175×10⁸ nm⁴ or larger. (The number of anisotropic shaped nanoscale scattering elements per unit area of the scattering layer being at least that value N.)

Another aspect refers to a lighting system for providing a chromatically tunable illumination of an ambience. The lighting system comprises a white light source for generating directed white light, a scattering layer for being illuminated by the white light source, the scattering layer comprising a nanostructure of nanoscale elements, the nanoscale elements having an anisotropy in the index of refraction and/or in the geometrical shape, and an electric field generator for generating an electrical field across the scattering layer. In dependence of the electrical field generated by the electric field generator, the nanoscale elements cause different Rayleigh-like scattering conditions for the directed white light. The scattering layer may be a part of a diffuser unit as disclosed herein. The electric field generator may comprise a power unit that is electrically in contact with the pair of areal electrical contacts.

Another aspect refers to the use of a diffuser unit as disclosed herein in a lighting system to provide at least two different illumination conditions, when being illuminated with white light, by setting at least two different optical properties of a scattering layer of the diffuser unit.

Another aspect refers to a method for providing a chromatically tunable transmitted light by scattering of light incident on a diffuser unit when illuminated with white light. The diffuser unit may be configured as disclosed herein and the method comprises the steps of illuminating the diffuser unit with white light, applying a voltage across the scattering layer, thereby setting a first operating state based on a first refractive index mismatch and/or a first effective size of the nanoscale scattering elements, in which the regularly transmitted light has a spectrum associated with at a first color point in the CIE 1976 u'-v'-chromaticity diagram; and changing the voltage, thereby varying the refractive index mismatch and/or the effective size of the nanoscale scattering elements, to set a second operating state based on a second refractive index mismatch and/or a second effective size of the nanoscale scattering elements, in which the regularly transmitted light has a spectrum associated with at a second color point in the CIE 1976 u'-v'-chromaticity diagram.

Another aspect refers to a method for tunable sun-sky imitating illumination, where the method comprises the steps providing a scattering layer with a nanostructure of nanoscale elements having an anisotropy in the index of refraction and/or geometry, directing white light onto the scattering layer, and generating an electrical field across the scattering layer. In dependence of the electrical field, the nanoscale elements cause different Rayleigh-like scattering conditions for the white light. In some embodiments, the methods for tunable sun-sky imitating illumination may comprise changing the Rayleigh-like scattering cross-section by aligning or misaligning the orientation of liquid crystals within the nanodroplets.

Another aspect refers to a method for producing a liquid crystal diffuser unit for providing a chromatically tunable scattering interaction onto directed light. The method comprises the steps providing a liquid pre-polymer, dispersing liquid crystals having an anisotropy in the index of refraction, optionally dispersing spacer elements in the liquid pre-polymer, providing the dispersion of the pre-polymer and the liquid crystals, and optionally the spacer elements, between a pair of areal electrical contacts, wherein at least one of the areal electrical contacts is configured to be transparent in the visible wavelength range, and curing the dispersion at curing conditions such as a time scale and/or a UV curing light intensity and/or a curing temperature that limits phase separation within the dispersion to result in the formation of nanodroplets of liquid crystals that are separated by the polymer, thereby forming a polymer dispersed liquid crystal layer as an interlayer between the pair of areal electrical contacts. In some embodiments, the pair of areal electrical contacts may be provided on respective PET layers and/or glass sheets.

Further embodiments of the above aspects, are disclosed in the dependent claims, which are incorporated herein by reference. For example, in some embodiments, the scattering layer may have a chromatic tunability range defined by the range of variation in the refractive index mismatch and/or the range of variation in the effective size of the nanoscale scattering elements. The scattering layer may be configured to provide light scattering cross-sections within the chromatic tunability range such that, for a CIE 1931 standard observer (2°), the spectrum of the regularly transmitted light corresponds to a color point in the CIE 1976 u'-v'-chromaticity diagram with u'-v'-coordinates larger than 0.20 and 0.465, respectively, when non-polarized white light with a spectral power distribution that is constant inside the visible spectrum (E standard illuminant) impinges with an incidence angle onto the scattering layer in particular for normal incidence or for a selected one or all incidence angles within the angular range from normal incidence up to an incidence angle of about 20°, 40°, or 60°, such as in the angular range from 30° to 50°, such as 45°. The scattering layer may be configured to provide light scattering cross-sections within the chromatic tunability range such that the regular spectral transmittance corresponds to a color point in the CIE 1976 u'-v'-chromaticity diagram with u'-v'-coordinates larger than 0.20 and 0.465, respectively, when measured with non-polarized white light under an incidence angle onto the scattering layer in particular for normal incidence or for a selected one or all incidence angles within the angular range from normal incidence up to an incidence angle of about 20°, 40°, or 60°. The scattering layer may be configured to provide light scattering cross-sections within the chromatic tunability range such that, for impinging white light with a spectral power distribution that is constant inside the visible spectrum (E standard illuminant), the spectrum of the diffuse light, integrated over all the scattering angles except those angles that depart by less than 20° from the regular transmission angle, corresponds to a color point in the CIE 1976 u'-v'-chromaticity diagram with u'-v'-coordinates smaller than 0.22 and 0.485, respectively. The scattering layer may be configured to provide light scattering cross-sections within the chromatic tunability range such that, for impinging white light with a spectral power distribution that is constant inside the visible spectrum (E standard illuminant) and for a CIE 1931 standard observer (2°), the Euclidean distance $\Delta u'v'$ between a color point, which is associated to the spectra of the transmitted light within the chromatic tunability range, or the regular spectral transmittance within the chromatic tunability range, and a color point, which is associated to the respective spectra of the diffuse light, is equal to or greater than 0.02, in particular even equal to or greater than 0.03, or even equal to or greater than 0.04, or even equal to or greater than 0.05.

In some embodiments, the Euclidean distance $\Delta u'v'$ for at least one color point, which is associated to the spectrum of the regularly transmitted light or the regular spectral transmittance within the chromatic tunability range, and the Planckian locus may be equal to or smaller than 0.1, in particular even equal to or smaller than 0.08, or even equal to or smaller than 0.05, or even equal to or smaller than 0.03, or even equal to or smaller than 0.01.

For the configuration within the chromatic tunability range, which corresponds to the maximum scattering cross-section, for a CIE 1931 standard observer (2°), the regularly transmitted light or the regular spectral transmittance may correspond to a color point in the CIE 1976 u'-v'-chromaticity diagram with u'-v'-coordinates greater than 0.20 and 0.465, respectively, such as greater than 0.2117 and 0.4851, respectively, or even greater than 0.212 and 0.485, respectively, or even greater than 0.225 and 0.5, respectively, or even greater than 0.2265 and 0.5029, respectively, or even greater than 0.24 and 0.514, respectively, or even greater than 0.243 and 0.5166, respectively, or even greater than 0.2598 and 0.5261, respectively, when non-polarized white light with a spectral power distribution that is constant inside the visible spectrum (E standard illuminant) impinges with an incidence angle onto the scattering layer in the range from normal incidence up to an incidence angle of about 60°. In addition or alternatively, for the configuration within the chromatic tunability range, which corresponds to the maximum scattering cross-section, for a CIE 1931 standard observer (2°), the regularly transmitted light or the regular spectral transmittance may correspond to a color point in the CIE 1976 u'-v'-chromaticity diagram with a u'-coordinate smaller than 0.465, such as smaller than 0.42 or 0.4, in particular smaller than 0.38 or 0.3605, or even smaller than 0.35.

In some embodiments, the wavelength dependent light scattering cross-section is given by a specific selection of properties of the scattering layer, which affect its optical properties, including: a refractive index of the nanoscale scattering elements, in particular an anisotropy in the refractive index and/or a refractive index of constituting matter of the nanoscale scattering elements, a size and/or a shape of the nanoscale scattering elements, in particular an anisotropy in the geometric shape, a refractive index of the host material, in particular an anisotropy in the refractive index and/or a refractive index of constituting matter of the host material, a filling ratio between the nanoscale scattering elements and the host material, and/or a layer thickness of the scattering layer. In some embodiments, a mean size of the nanoscale scattering elements may be in the range from about 10 nm to about 500 nm such as in the range from about 20 nm to about 400 nm such as in the range from about 30 nm to about 300 nm, and/or a volume fraction between the nanoscale scattering elements, in particular between liquid crystal droplets, and the host material may be in the range from about 30% to about 70% such as in the range from about 40% to about 60%, and/or a layer thickness of the scattering layer may be in the range from about 10 μm to about 500 μm such as in the range from about 20 μm to about 350 μm, e.g. in the range from about 30 μm to about 200 μm or even in the range from about 50 μm to about 100 μm, and optionally the layer thickness is defined by spacer elements and/or has a variation in thickness less than 10% across an area of 10 cm×10 cm of the scattering layer.

In some embodiments, the constant c is equal to or larger than $5.836 \times 10^7$ nm$^4$, in particular equal to or larger than $1,664 \times 10^8$ nm$^4$, such as equal to or larger than $3.235 \times 10^8$ nm$^4$. Moreover, in some embodiments, the constant c is equal to or smaller than $3.363 \times 10^9$ nm$^4$, in particular equal to or smaller than $2.5 \times 10^9$ nm$^4$, such as equal to or smaller than $1.6499 \times 10^9$ nm$^4$.

In general, the diffuser unit may comprise a pair of areal electrical contacts for providing an electric field, in particular for interacting with the nanoscale scattering elements and/or the host material, wherein the areal electrical contacts extend on opposite faces of the scattering layer and at least one of the areal electrical contacts is configured to be transparent in the visible wavelength range. The diffuser unit may further comprise a reflective layer, reflective sheet side, an in particular UV or IR absorbing/protection layer, and/or a wavelength independent diffusing layer, and/or a transparent conducting oxide layer providing one of the areal electrical contacts.

In some embodiments, the optical parameters of the scattering layer may be selected such that without an applied electric field, the white light passing through the scattering layer is separated in a warmer direct light portion (in particular having a lower CCT) and a colder diffused light portion (in particular having a higher CCT).

In some embodiments, the wavelength dependent light scattering cross-section in the blue (such as in the wavelength interval 440 nm to 460 nm) may be larger than in the yellow (such as in the wavelength interval 540 nm to 560 nm), in particular it may be at least about 15%, such as at least about 30% larger. Moreover, the wavelength dependent light scattering cross-section in the yellow (such as in the wavelength interval 540 nm to 560 nm) may be larger than in the red (such as in the wavelength interval 640 nm to 660 nm), in particular it may be at least about 10%, such as at least about 20% larger. Moreover, the wavelength dependent light scattering cross-section may decreases with increasing the wavelength, e.g. it decreases monotonically when increasing the wavelength ($\sigma(\lambda_1) < \sigma(\lambda_2)$ for $\lambda_1 > \lambda_2$).

In some embodiments, the electric field generator may be configured to provide at least two operating states by setting the relative refractive index and/or the effective size of the nanoscale scattering elements with respect to an incidence direction of the directed white light of the white light source. Optionally the at least two operating states may provide Rayleigh-like scattering conditions that differ in the generated uniformity of illuminance in the ambience.

In some embodiments, the lighting system may comprise a control unit to control the strength of the electrical field generated by the electric field generator, thereby controlling the light scattering cross-section. In addition or alternatively, the lighting system may comprise a mount structure for varying the angle of incidence of the directed white light onto the scattering layer and in particular configured to position the white light source with respect to the scattering layer or to orient the scattering layer with respect to the white light source, thereby providing a plurality of different incidence angles of the directed white light onto the scattering layer that result in Rayleigh-like scattering interaction that vary due to the anisotropy in the index of reflection and/or the effective size of the nanoscale scattering elements. In addition or alternatively, the lighting system may comprise a polarizer such as a wave plate for changing the polarization of the directed white light.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIGS. 5A to 5D show schematic uniform chromaticity diagrams for illustration of the chromatic perception of tuned transmittances of a diffuser unit for a white light source illumination and an exemplary change in the respective chromatic perception of the diffused light;

FIGS. 6A to 6C show two schematic polar plots illustrating the differences in light interaction for two exemplary visible wavelengths as well as an illuminance plot for three operating states of a PDLC-based diffuser unit;

DETAILED DESCRIPTION

Figure 1A:
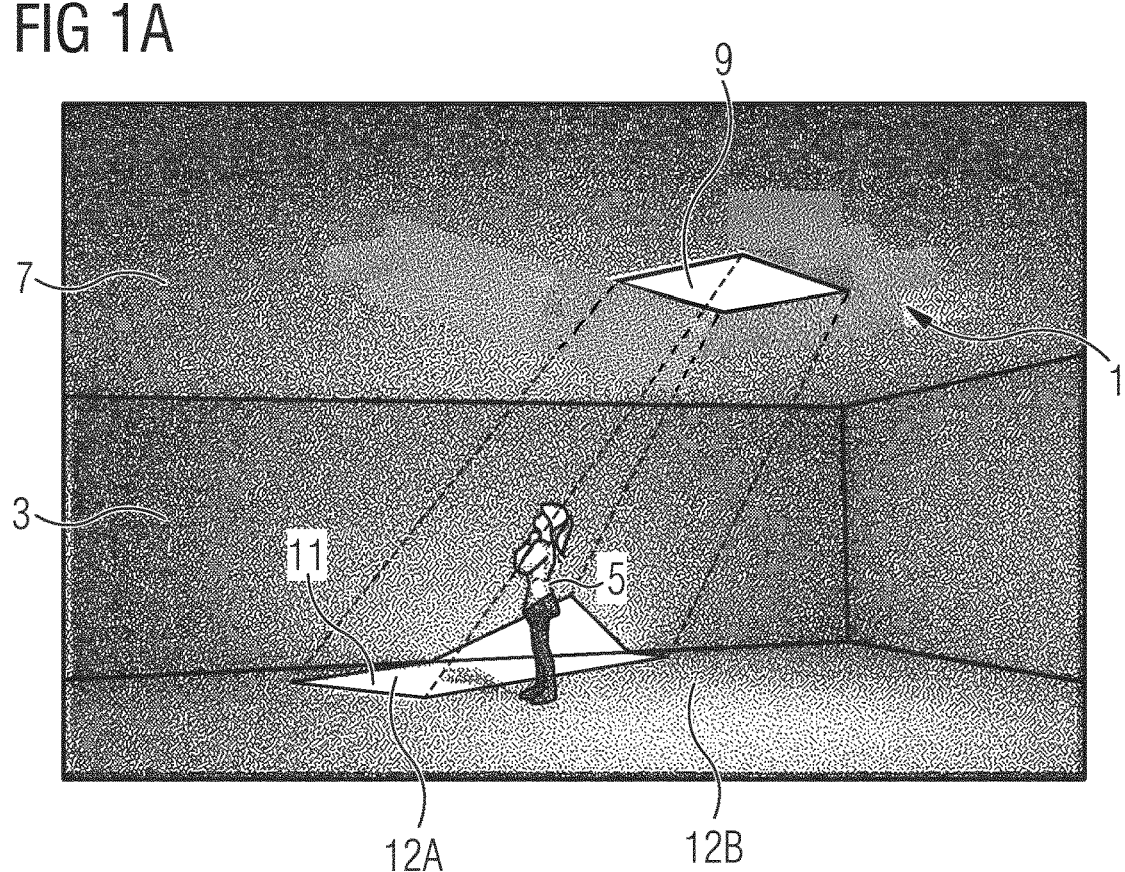
FIGS. 1A and 1B are schematic views of a sun-sky-imitating lighting system for chromatically tuning the transmittance of a diffuser unit to vary the perceived illumination situation.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that one can recreate optical effects that are caused in nature by the varying optical path lengths of the sunlight through the atmosphere, i.e. the influence of the number of scatterers involved in the scattering. Specifically, it was realized that a scattering situation, which provides for an anisotropy in refractive index and/or in geometrical dimension of scatterers, may be used to create a similar versatile sun-sky appearance as it is known in nature, specifically the changing color of the direct sunlight illumination (as well as of the sky).

More specific, it was realized that an anisotropy in the refractive index allows varying the relative refractive index m that contributes to Rayleigh or Rayleigh-like scattering, while an anisotropy in the geometrical dimension of scatterers allows varying the "seen" size d of the scatterer being subject to illumination and, thus, its effective particle diameter D of the nanostructure that contributes to Rayleigh or Rayleigh-like scattering.

Moreover, it was realized that, in configurations as those of the initially mentioned lighting systems, using a specifically pre-selected number of scatterers to provide for the desired scattering conditions (e.g. needed for imitating the sun-sky appearance) is limited in its adaptability because the number of scatterers is a fixed pre-set parameter. However, there were optical scattering configurations identified that, despite a fixed number of scatterers, allow tuning the scattering conditions by varying the above identified parameters index mismatch (relative index of refraction m) and effective particle diameter D.

Moreover, the disclosure is based in part on the realization that nanoparticle based Rayleigh-like scattering panels, as described in the above identified disclosures, may not allow a change in the optical scattering conditions to the extent needed for imitating varying sun-sky-appearances. However, it was realized that introducing, for example, liquid crystal based structures provides access to a tunability of the transmittance of such a diffuser panel due to changes in a scattering parameter within a large range, thereby being able to tune (set/adapt) the scattering parameter to a plurality of values (i.e. at least two different scattering conditions). For example, it was realized that using liquid crystal droplets dispersed in a solid transparent host material as scattering centers in a nanosize range (e.g. for Rayleigh-like scattering), one can set a contributing relative index of refraction by changing the voltage applied across the liquid crystal droplets. Specifically, applying an electric field aligns the liquid crystal orientations within distinct nanodroplets to some extent.

In this context, it was realized that the size of the liquid crystal droplets can be decreased down to the nanoscale in a polymeric matrix by modifying the kinetics of phase separation e.g. within a photo-polymerization reaction, e.g. by increasing the curing light intensity and/or increasing the filling ratio of a liquid crystal/polymer mixture leading to the formation of a polymer dispersed liquid crystal (PDLC) film/layer. It was realized that thereby liquid crystal droplet size distributions can be generated that provide for mean sizes in, for example, the range from about 10 nm to about 500 nm, such as about 100 nm or about 200 nm, with full width half maximum (FWHM) values of, for example, about 50 nm or about 100, and below.

Moreover, it was realized that depending on the selected refractive index of the matrix and the contributing ordinary and extraordinary indices of the liquid crystal, the range of index mismatch, that in principle is available for adapting the scattering conditions, can be selected. It was further realized that by reducing the thickness of the liquid crystal droplets containing layer, required electric field values can be achieved with low voltage values, e.g. in the range from 0 V to about 500 V such as from 0 V to the standard 220 V AC. Thereby, low voltage implementations of tunable diffuser units become possible.

Furthermore, it was realized that a PDLC film can be created with lateral dimensions that are adapted to the optical layout of lighting systems, in particular areal lighting systems extending over closed areas with a size of e.g. 1 m×2 m (or more) for large continuous areas, starting with small closed area sizes in the range of e.g. about 10 cm×10 cm for tile structures.

Moreover, it was realized that a PDLC layer can be created with a homogeneous thickness of e.g. less than 500 µm such as 300 µm, or even less than 200 µm down to less than 100 µm or even less than 50 µm, e.g., having a homogeneity of less than 10% across 10 cm of the lateral dimensions of the PDLC layer. Accordingly, a homogeneous scatterer distribution and a homogeneous scattering behavior can be achieved over the required sizes for sun-sky imitating lighting systems comprising in particular a large area being perceived as the sky.

It was further realized that the anisotropy in refractive index may be used in reverted configurations in which e.g. static scatterer optical conditions are used within an adaptable host refractive index. Moreover, the anisotropy in refractive index may be used in the context of a variable direction of incident light.

Furthermore, it was realized that similar effects can be achieved by changing the degree of alignment of geometrically asymmetric scattering centers or using aligned geometrically asymmetric scattering centers in the context of a variable direction of incident light.

Finally, it was realized that, using the herein disclosed tunable Rayleigh-scattering concept, one can tune the color of the sun-imitating light beam as it is perceived for different times of the day based on e.g. a white light source. The change in color allows providing a perceived temporal change in perception linked e.g. to the time of the day. Adding a change in directionality further enables a non-static illumination condition. Thus, the tuning of the transmittance enables a tunable illuminance profile that allows setting a desired uniformity of the illuminance that is provided by the lighting system e.g. within a room, in particular in the illuminated area.

The skilled person will acknowledge those optical aspects as well as those aspects of the implementations disclosed herein that can be broadly applied and understood for varying conditions, implementations, and/or applications. Thus, targeting an at least to some extent condense disclosure, specific aspects are illustrated in more detail within one condition, implementation, and/or application, knowing that the skilled person will appreciate suitable transfer and equal applicability in another condition, implementation, and/or application.

In the following, the optical considerations are at first explained generally and then exemplarily in context with a liquid crystal nanodroplets implementation (FIGS. 1A to 9B). Then, exemplary configurations of lighting systems are disclosed that generally are applicable for sun-sky-imitation using e.g. Rayleigh-like scattering (FIGS. 10A and 10B). Thereafter, further (at least partly combinable) configurations are disclosed that use different optical approaches to tune and/or provide the anisotropy of the scatterers such as varying the incident light direction (FIGS. 11 and 14), varying the polarization of the incident light (FIG. 12), and varying the effective scatterer size (FIG. 13). Finally, a microscopic parameter range associated with the tunable scattering is disclosed in connection with FIGS. 15 and 16.

Figure 1B:
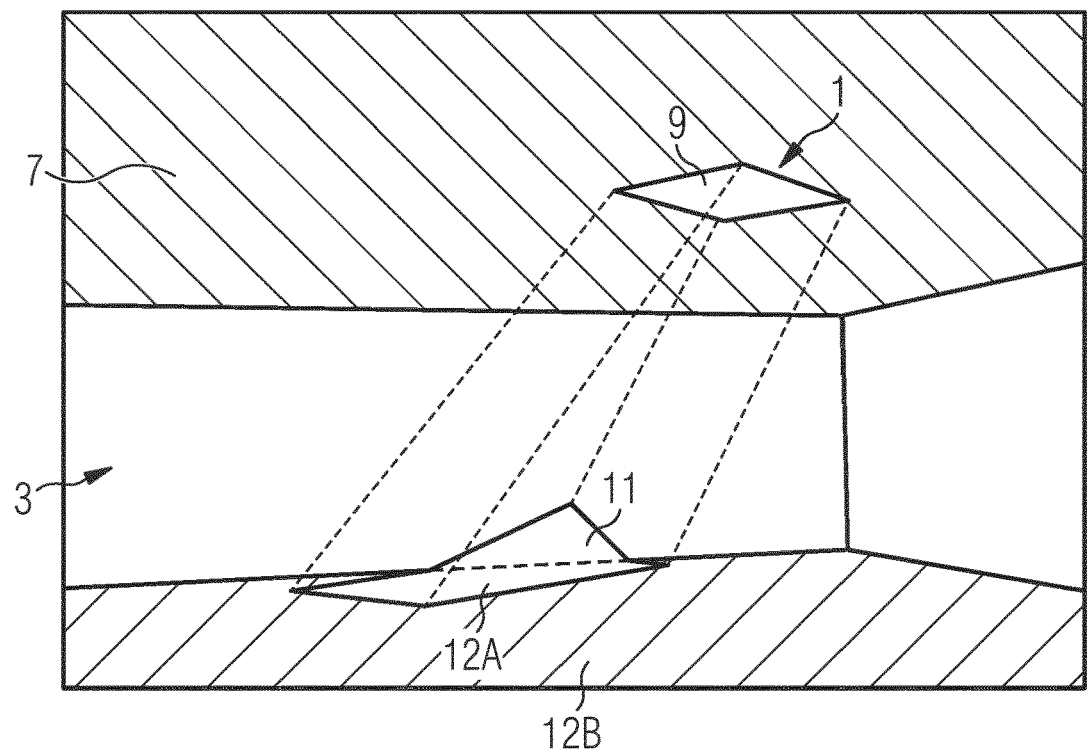

FIGS. 1A and 1B illustrate how a sun-sky-imitating lighting system 1 can exemplarily be implemented within a room 3 and how the illumination would be perceived by an observer 5. Specifically, FIG. 1A is a picture-like illustration of a model lighting configuration and FIG. 1B is a drawing reproduction of the illustration of FIG. 1A. In the exemplary installation of lighting system 1, a ceiling 7 comprises a panel-shaped diffuser unit 9 of lighting system 1 that comprises a Rayleigh-like scattering layer. During operation of the lighting system 1, diffuser unit 9 is illuminated from above under an inclination angle by a white light source of lighting system 1 (not shown).

Room 3 is illuminated by two types of light originating from the white light of the white light source. Specifically, by interaction with the Rayleigh-like scattering layer, the white light is separated into a transmitted warmer component (lower CCT) and a diffused colder component (higher CCT). As directed light, the warmer component simulates the sunlight and shines onto a limited area 11 within room 3 setting that area into a specific chromatic tone, e.g., its lower CCT is measured at an exemplary point 12A within limited area 11. Limited area 11 is given by the size of diffuser unit 9 and the divergence of the transmitted white light. As diffused light, the colder component from all over limited area 11 simulates the sky and lights up essentially the complete room 3 with another specific chromatic tone. E.g., its higher CCT is measured at an exemplary point 12B outside limited area 11.

For the herein disclosed concepts, the appearance of the light source itself, i.e. when looking at the light source, is of less relevance and it is referred to the above mentioned applications for further details. Further details for installations in reflection and or transmission are described herein in connection with FIGS. 10A and 10B. The above mentioned disclosures illustrate additionally a plurality of embodiments with varying shapes of diffuser units being provided e.g. in walls and/or ceilings.

In prior art systems, the scattering parameters in the Rayleigh panel are fixed by the type and number of nanoparticles and the type of the host material. Accordingly, the two CCT values are fixed as well, for example, in a manner corresponding to the situation of a sunny blue sky day at noon.

The herein described embodiments allow varying the perceived color of the transmitted (and diffused) light by adapting the scattering cross-section via the refractive index mismatch and/or the effective size of the scattering centers. Specifically, configurations become possible, in which the transmittance of the diffuser unit 9 is tuned, and thus the color of the transmitted light is tuned by scattering from being perceived with a white-yellow color (over orange) to being perceived with a reddish color. Tuning the transmittance, and thus the color of the transmitted light, opens the possibility to mimic the sun's color variations during the day and thereby can provide a time feeling to the user—in contrast to a static system.

Tuning the transmitted light by scattering allows an in principle loss free tuning—in contrast to absorption-based color tuning. The scattered light is (re-) used by illuminating the ambiance with a different diffuse emission characteristic than the remaining transmitted directed light. The perceived colors at points 12A and 12B are created by a wavelength dependent scattering process, i.e. preferably taking out blue-side wavelength contributions from a white light beam.

Due to the tuning by scattering, the illumination within a room decreases in the sun-beam area (e.g. at point 12A) and increases in the remaining areas being subject only to illumination by the scattered light (e.g. at point 12B).

In other words, the herein disclosed concepts allow switching between operating states of the lighting system that cover a chromatic range from the sunny blue sky day at noon to the flat incident sun in the morning (or in the evening). As will be explained below, the herein described embodiments allow, for example, shifting the color of the sun towards a sunset reddish color and the color of the deep blue sky to a bluish white color as one can see it around the sun at sunrise/sunset.

Referring to the CCTs provided by the lighting system, the CCT of the transmitted light is lower than the CCT of the diffused light. However, in different operation states, the CCT of the transmitted light and the CCT of the scattered light will both change in the same direction, i.e. both increase or decrease, due to a decreasing or increasing scattering activity within the diffuser unit.

It is noted that the emitted color spectrum of the light source does not need to be adapted to achieve the above tuning effects. Generally, the light source can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

For identifying the herein disclosed CCT values, u'v'-values, and the transmittance, the white light source is, for example, an E standard illuminant being an equal-energy radiator inside the visible spectrum. Although being a theoretical reference, the E standard illuminant gives equal weight to all wavelengths, and thus is suited in particular for wavelength depending scattering tuning. Other standard illuminants (such as a D65 standard illuminant that provides uniform illuminance (lux/m) onto the sample over a large visible spectral range) can be used, for example, when comparing optical features with reference samples and transfer the measured results to the E standard illuminant, e.g. simply by normalizing the resulted spectrum by the spectrum of the illuminant.

Referring again to FIGS. 1A and 1B, limited area 11 can be illuminated with different color tones, which may dominate the perceived color of a room. At the same time, the color of the diffuse light may vary and thus influence the illumination of room 3 as well. Besides the perceived color tones, also the luminance within and outside of area 11 is affected by the tuning, thereby allowing to modify the uniformity of luminance distribution within room 3.

In the following, aspects of the tunability of the refractive index of an ensemble of liquid crystal molecules are explained in connection with FIGS. 2A and 2B. Providing such ensembles in a nanostructure comprising nanodroplets in a liquid crystal (LC) based diffuser unit results in Rayleigh-like scattering that can be used for chromatically tuning the light interaction.

Figure 2A:
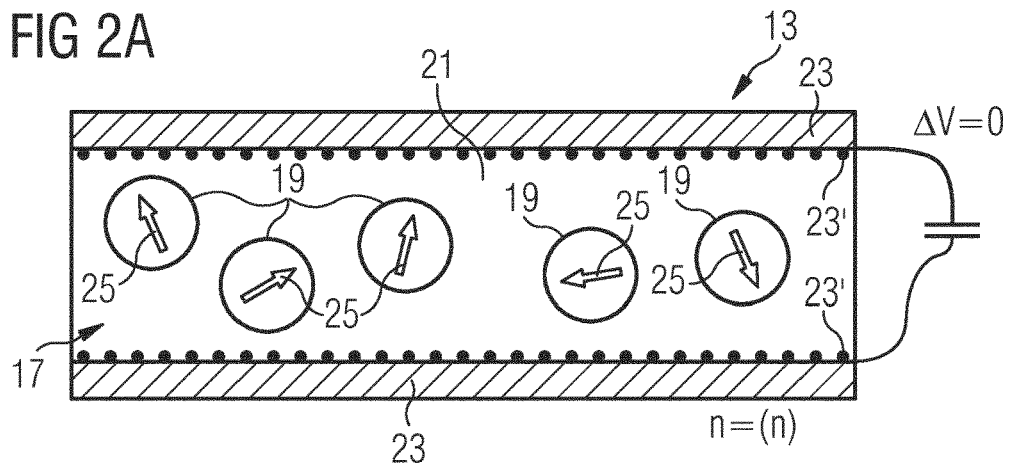
FIGS. 2A and 2B are schematic illustrations of operating states of a liquid crystal droplets based diffuser unit for chromatically tuning the transmittance.
Figure 2B:
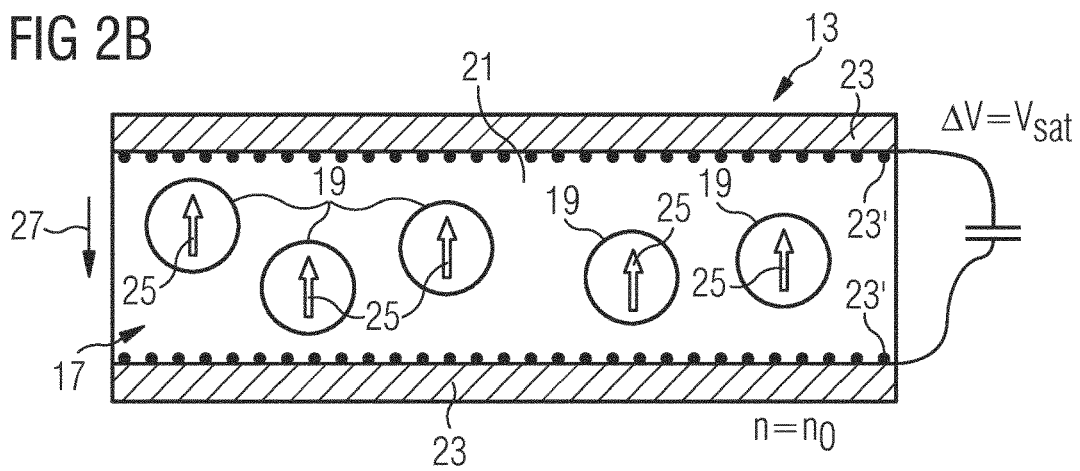

FIGS. 2A and 2B illustrate two different operating states of an LC based diffuser unit 13 as explained below. LC based diffuser unit 13 comprises a layer 17 formed of LC nanodroplets 19 within a host material 21. For example, layer 17 can be a polymer dispersed liquid crystal (PDLC) film. Each side of layer 17 is in contact with a cover sheet, for example, an ITO glass sheet 23 that provides an areal electrical contact 23'. Areal electrical contacts 23' extend in two-dimensions along the side faces of layer 17. When a voltage (DC or AC) is applied to areal electrical contacts 23' (as schematically indicated in FIG. 2B by arrow 27), the pair of areal electrical contacts 23' enables creating a (large-area) electric field for interacting with LC nanodroplets 19 distributed in the two-dimensional film/layer. At least one of the pair of areal electrical contacts 23' is configured to transmit visible light. Accordingly, light—e.g. from a white light source—can enter layer 17 and scatter at nanodroplets 19 that represent accordingly nanoscale scattering elements.

Assuming the liquid crystals have (at least) an optical uniaxial anisotropy, its index of refraction can be approximated by two principal refractive indices, an ordinary refractive index $n_o$ associated with linear polarization states orthogonal to the optical axis, and an extraordinary refractive index $n_e$ with linear polarization states parallel to the optical axis. Thus, light propagation in liquid crystals along or normal to the optical axis will be subject to different refractive indices. Their difference results in a birefringence $\Delta n = n_e - n_o$. The birefringence $\Delta n$ is usually positive for LCs and may vary in a range from 0 to about 0.5, e.g. be about 0.1 or 0.3. Various types of liquid crystals are mentioned below indicating potential ranges of $n_e$ and $n_o$.

In FIG. 2A, the direction of a resulting optical axis for each of the plurality of nanodroplets 19 is indicated by arrows 25. Without any external influence (e.g. there is no electric field applied), the orientation of arrows 25 for the plurality of nanodroplets 19 can be assumed to be arbitrarily distributed in all directions. In other words, in an ensemble of liquid crystal droplets within such a polymer film and without an applied electric field, inside each single nanodroplet, the liquid crystal molecules may have a certain order due to the organization properties of the LCs resulting in the optical axis indicated by the arrows 25, but that order within each nanodroplet will essentially randomly vary from nanodroplet to nanodroplet. As a consequence, an average refractive index $\langle n \rangle$ can be associated with the ensemble of liquid crystal droplets:

$$\langle n \rangle = \frac{(n_e + 2n_o)}{3}.$$

The average refractive index $\langle n \rangle$ is independent of the angle of incidence and can be associated with an OFF operation state of LC based diffuser unit 13, i.e. no voltage is applied between areal electrical contacts 23' ($\Delta V=0$). The average refractive index $\langle n \rangle$ is herein also referred to as n_OFF.

Referring to FIG. 2B, applying an electric field between areal electrical contacts 23' introduces a—gradually with the voltage/electric field increasing—alignment of the LC molecules within each nanodroplet, as will be further explained below. For example, electric field values of about e.g. 10-30 V/μm may be needed to enforce maximum alignment of the LCs within a nanodroplet together with a maximal alignment of all orientations, as illustrated in FIG. 2B.

The alignment changes the refractive index that is experienced by light propagating in a specific direction. Specifically, the alignment removes the random orientation of the nanodroplets resulting optical axes such that the anisotropy of the LC starts to influence the optical features of layer 17. Applying a voltage between areal electrical contacts 23' ($\Delta V \neq 0$) at least to some extent forces an alignment of arrows 25 with the electric field in line with any associated electric (permanent or induced) dipole moment of the LCs/the LC nanodroplets.

The alignment increases with increasing electric field. At the interface between the liquid crystal phase within a nanodroplet and the surrounding host material, there may be an interaction between the host material and a LC such that not all LCs within a nanodroplet may align with the electric field. For a given configuration of layer 17, generally, a saturation voltage Vsat is associated with the electric field that achieves the maximal (or essentially maximal) alignment. FIG. 2B illustrates schematically the maximal (or essentially maximal) alignment of the LCs at Vsat by showing all arrows 25 to be parallel to the indicated electric field direction of arrow 27.

For example, assuming that the optical axes of all molecules align along the electric field (i.e. a saturation voltage is applied across the PDLC film), light propagating along the electric field/the optical axes experiences essentially the refractive index $n_o$. Thus for that specific propagation direction, a tunability range of the index of refraction experienced within nanodroplets extends from $\langle n \rangle$ to $n_o$, herein referred to as the tuning range $\delta n = |\langle n \rangle - n_o|$.

Due to the above mentioned influence of the interface between nanodroplets and host material, for small nanodroplets having a relatively large volume portion being subject to the influence and a small central inner portion being less influenced, a larger electric field will be needed to reorient also those liquid crystal molecules being influenced by the interaction with the host material. Layer 17 may be reduced in thickness to enable a larger electric field strength for nanodroplets for lower voltages such that Vsat can be reached even at acceptable low voltages for e.g. nanodroplets based PDLC films.

Figure 3:
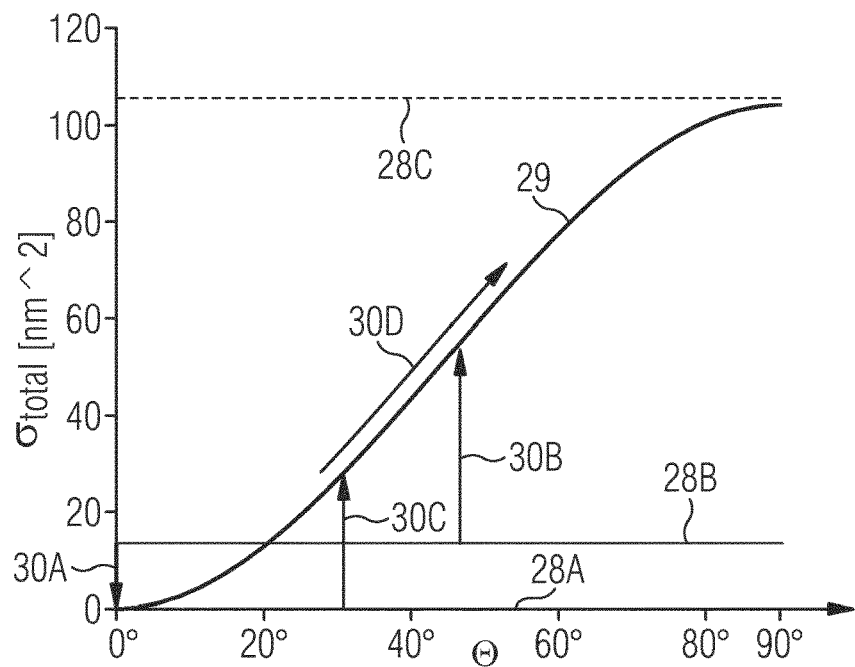
FIG. 3 is a schematic illustration of the total cross-section in dependence of the incidence angle for an exemplary PDLC-based diffuser unit.

Light propagating under an angle with respect to the direction of the optical axis will experience at least partly the extraordinary refractive index $n_e$ for a linear polarization direction in the direction of the optic axis becoming apparent from FIG. 3.

In FIG. 3, the total ensemble scattering cross-section amounts $\sigma_{total}$ (herein also referred to as total scattering-cross section) are simulated for the below in more detail explained PDLC film configuration of NOA65 and E7 for a wavelength of about 550 nm and maximum alignment at Vsat. Specifically, there is an independence from the incident angle θ of the total scattering-cross section for isotropic nanodroplets being associated with refractive indices of no, $\langle n \rangle$, and ne (illustrated as lines 28A, 28B and 28C, respectively), with constant values derived from a Rayleigh-like/Mie scattering model.

For anisotropic LC nanodroplets and for incident light in a p-polarization state, the dependence from the incident angle θ of the total scattering-cross section is illustrated as a schematic curve 29. For anisotropic LC nanodroplets and incident light in the s-polarization state, there is again an independence from the incident angle θ of the total scattering-cross section, which is at a value corresponding to line 28A (cross-section associated with no) for isotropic LC based nanodroplets because the anisotropy does not affect s-polarized light. One acknowledges that for orthogonal incidence, only the total scattering cross-section associated with no applies, while for tilted incidence the anisotropy contributes to the scattering. The dependence is related to the single particle scattering cross-section.

It is noted that, for the PDLC film configuration of NOA65 and E7 (see e.g. also FIG. 4A), for $n_o$ there is essentially no index mismatch present so that the total scattering-cross section is close to zero. The largest index mismatch is given for $n_e$, resulting in the largest total scattering-cross section in the p-polarization state for "parallel" incidence.

Figure 4A:
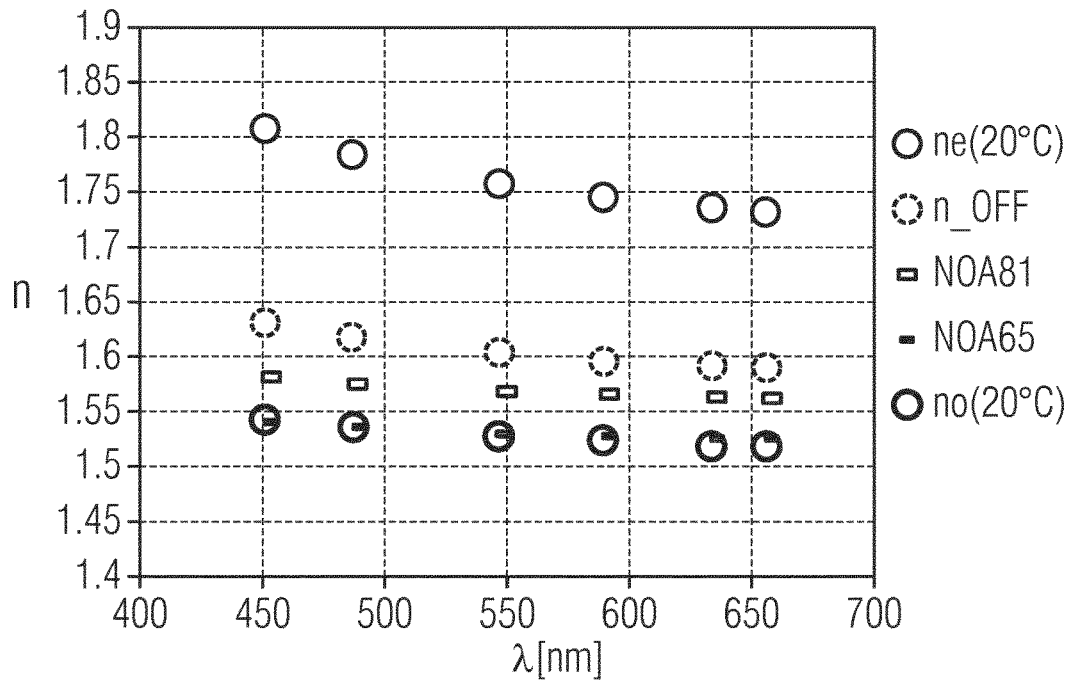
FIGS. 4A and 4B illustrate an exemplary refractive index wavelength dependence and exemplary combinations of substances used in PDLC-based diffuser units.
Figure 4B:
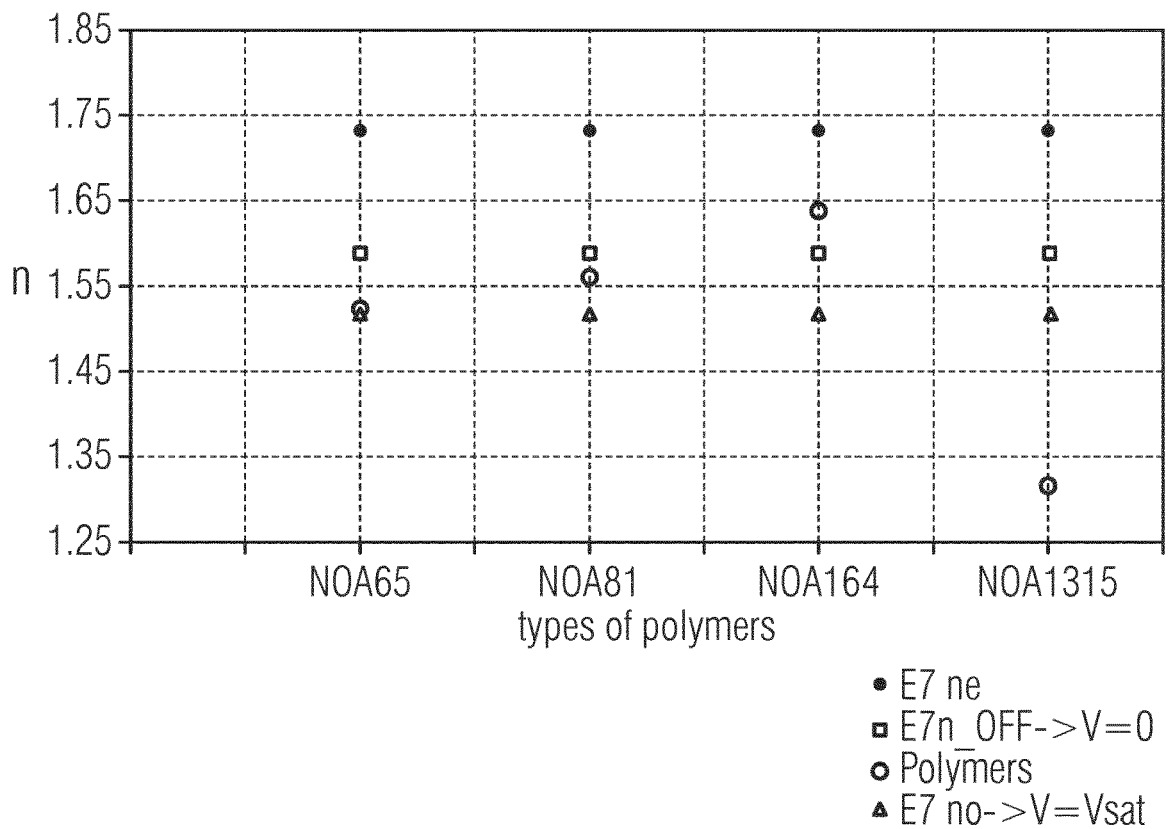

With reference to FIG. 4B, it is noted that for other PDLC film configurations, $n_o$ may differ from $n_h$ such that there is always an index mismatch present for s-polarization. However, depending on the relative position of $n_h$ being either in-between or outside the range defined by $n_o$ and $n_e$, there may be a "zero" crossing of the total cross section or not for a single polarization as will be understood by the skilled person.

Further, for a not-polarized light beam, a superposition of the total scattering-cross sections for p-polarization and s-polarization applies. In the example illustrated in FIG. 3, this means that 50% of the light is not scattered at any angle and that the remaining 50% of light are scattered in accordance with curve 29. In other words, the total scattering cross-section of curve 29 would be halved but maintain its general shape. Similar considerations apply to other PDLC film configurations.

For the PDLC film configuration of NOA65 and E7, FIG. 3 also illustrates the tuning possibilities of the various LC based tuning configurations discussed herein such as the electric field based tuning, the incident angle based tuning, and the polarization based tuning. Specifically, in that configuration, the PDLC film comprises a nematic liquid crystals mixture "E7" produced by Merck KGaA embedded in the Norland Optical Adhesive 65 (known as "NOA65") produced by Norland optics Inc.

With respect to tuning the mismatch of refractive indices (and thus the Rayleigh-like scattering cross-section due to tuning the relative refractive index m), the embodiment of LC based diffuser unit 13 provides for an OFF operation state with the average refractive index n_OFF (i.e. $\langle n \rangle$) applicable to all incidence directions. In addition, in dependence of the applied voltage, for each incidence direction, the refractive index will change until Vsat is reached and the associated refractive index (based on essentially all LCs being aligned) has been established. This corresponds to a range of V-operation states, beginning at the OFF operation state and continuing up to a Vsat-operation state.

For example, arrows 30A and 30B indicate tuning ranges for electric field based tuning for orthogonal incidence (0°) and inclined incidence (45°). The total scattering cross-section starts for each incidence angle at a value unequal zero corresponding to $\langle n \rangle$ for V=0 and decreases to (almost) zero for orthogonal incidence while increasing for 45° incidence until the for not-polarized light adapted value of curve 29 is reached.

Moreover, for any applied electric field that results in at least some degree of alignment (i.e. no random distribution), the refractive index will change when the incident angle θ is unequal zero and the polarization of the "to be scattered" light is changed.

For an incidence angle of 30°, arrow 30C illustrates the tuning for a polarization change from s-polarization to p-polarization, assuming a static electric field being applied by, e.g. Vsat. For s-polarization, the total scattering cross section starts for each incidence angle at almost zero and increases (assuming at least some incidence angle larger 0°) to the total scattering cross section for p-polarization as schematically indicated by arrow 30C for the incidence angle of 30°.

Moreover, for any applied electric field that results in at least some degree of alignment (i.e. no random distribution), the refractive index will change when the incident angle θ of the "to be scattered" light is changed. Herein a changing incident angle is associated with, for example, a lighting system with the feature of a "moving sun". This aspect corresponds to (V-dependent) θ-operation states. As said, although θ-operation states are in principle applicable to any V≠0, the largest effect of the moving sun onto the Rayleigh scattering conditions is given for Vsat. Moreover, the direction of the chromatic tuning depends on the relative size between $\langle n \rangle$ and $n_o$, i.e. whether more scattering occurs close to e.g. normal incidence or "parallel" incidence of white light onto a diffuser unit. The chromatic appearance of the moving sun can be further fine tuned with selecting the voltage, i.e. the electric field or degree of alignment.

Arrow 30D illustrates the tuning for a change in incidence angle, assuming a static electric field being applied by, e.g., Vsat. Again starting at orthogonal incidence with a total scattering cross section of almost zero, the scattering activity increases along the for not-polarized light adapted curve 29 with increasing incidence angle.

Furthermore, it will be clear that the same tuning of the mismatch in refractive index can be realized in configurations, in which the host material is composed of LCs and the nanodroplets are replaced by e.g. a static nanostructure such as by solid nanoparticles.

As mentioned above, the tuning behavior (increase/decrease/change between increase and decrease in scattering activity) may differ for other PDLC film configurations when using the various tuning approaches disclosed herein, depending on the relative refractive indices (see FIG. 4B described below).

In summary, depending on a pre-selected or changing propagation direction, a preselected or changing electric field, and/or a pre-selected or changing polarization, operation states of diffuser unit 13 with different optical scattering parameters can be selected.

In view of the above, there are specific refractive index parameters that characterize the mismatch of a specific layer configuration: the index of refraction of the host material $n_h$ (in a PDLC film a non-tunable material), the averaged refractive index $\langle n \rangle$ (n_OFF, associated with the random average orientation of LC within the nanodroplets), and the index of refraction at saturation $n_o$. For orthogonal incidence on a LC droplet based scattering unit, those parameters define the chromatic tunabilty of the LC based scattering unit. As pointed out above, the chromatic tunabilty varies further with the incident angle.

FIG. 4A illustrates the above parameters, and thus the range of tunability of the above mentioned exemplary PDLC film of NOE65 and E7 for the visible wavelength range. E7 has a relatively high birefringence and a positive dielectric anisotropy. E7 contains several cyanobiphenyl and cyanoterphenol components at a specific composition. The optical properties allow a large tunable range of the refractive index for nanodroplets that can then be used for Rayleigh-like scattering in a PDLC scattering unit. NOA65 is a clear, colorless, liquid photopolymer that forms the transparent structural basis of the scattering unit. Curing of NOA65 can be performed with ultraviolet light exposure, where the curing process depends mainly on the intensity of the UV light used for polymerization.

Specifically, FIG. 4A shows the refractive index $n_h$ of NOA65 which decreases from about 1.540 at 450 nm (at 20° C.) to 1.524 at 650 nm (data points "NOA65"). Furthermore, FIG. 4A shows the average refractive index n_OFF of E7 for randomly oriented liquid crystal molecules (no voltage applied; data points "n_OFF"). The average refractive index n_OFF decreases, however, generally at larger refractive indices as NOA65 from about 1.632 at 450 nm (at 20° C.) to 1.590 at 650 nm. Similarly, the ordinary refractive index of aligned liquid crystal molecules (i.e. the ordinary index of refraction at saturation $n_o$, i.e. saturation voltage applied; V=Vsat, data points "no(20°)") decreases, however, at values comparable to the ones of NOA65. For example, the ordinary refractive index $n_o$ of E7 decreases from about 1.543 at 450 nm (at 20° C.) to 1.518 at 650 nm. The range of tunability δn is accordingly 0.09 at 450 nm and 0.07 at 650 nm and accordingly comparable across the visible wavelength range. In FIG. 4A in addition, the extraordinary refractive index $n_e$ of the respective liquid crystal molecules (data points)"ne(20°)") and the refractive index of NOA81 (data points "NOA81") as an alternative host material are indicated for completeness. The refractive index $n_h$ of the alternative polymer NOA81, which decreases from about 1.58 at 450 nm (at 20° C.) to 1.56 at 650 nm (data points "NOA81"), i.e. larger than for NOA65.

In view of the comparable refractive indices of the matrix $n_h$ for NOA65 and the liquid crystal under saturation $n_o$, it becomes clear that the range of tunability may also cover the situation of an essentially non-scattering condition, i.e. unaffected transmission of the light with the respective incident angle (transmission mode of the scattering unit).

Moreover, for the above situation, the index mismatch between the host material and the scattering nanodroplets is given by the range of tunability δn, ending essentially at no index mismatch for Vsat for orthogonal incidence.

FIG. 4B illustrates an overview of refractive index parameters at 650 μm for four host polymers, including NOA65 and NOA81 of FIG. 4A as well as two further alternative host materials, for which there are—like for NOA81—no transmission modes of the scattering unit at the end of the tunability range of E7 (for orthogonal incidence). For E7, the ordinary, extraordinary and the average index of refraction are indicated for comparison.

For the host material NOA81, the refractive index $n_h$ is in-between n_OFF and $n_o$ of E7. For the host material NOA164, the refractive index $n_h$ is about 1.64, i.e. even larger than n_OFF of E7. For the host material NOA1315, the refractive index $n_h$ is about 1.32, i.e. significantly lower than $n_o$ of E7. Similarly, there is also a large variety of liquid crystals and respective values for n_OFF, $n_o$, and $n_e$ so that in principle there is a wide range for selecting optical parameters defining the operation states of a diffuser unit based on the range of tunability δn and the refractive index $n_h$.

Further exemplary materials for liquid crystal based diffuser units are disclosed below in connection with the manufacturing process described in connection with FIG. 8.

FIGS. 5A to 5D show schematic uniform chromaticity diagrams (also referred to as CIE 1976 u'-v'-chromaticity diagram) to illustrate the change in the color of the transmitted direct light as well as the diffused light. Therein, points on a border line 32 (the two sides of the triangular-like shape) correspond to monochromatic spectra (delta-like); in other words, the wavelengths increase at the curved surface border on the left and top side from, for example, 420 nm at the bottom point to about 510 nm at the top left corner to about 680 nm at the right corner. The coordinates are referred to as u'-chromaticity coordinate and v'-chromaticity coordinate. In addition, a Planckian locus 31 is indicated in the figures representing the spectrum of a Planck radiator at respective temperatures, for example, in the range from below 1000 K to about 100 000 K. Planckian locus 31 further defines the CCT for the various temperatures.

In FIG. 5A, color areas are schematically indicated. Specifically, the reddish area is referenced as I, the greenish area as II, and the bluish area as III. The reddish area I and the greenish area II are essentially separated by Planckian locus 31 in the range from 2000 K to 10000 K, and Planckian locus 31 points to the bluish area III. In the region of the ending of the Planckian locus 31, a mix of colors results in a whitish appearance of the colors.

For a sun-like imitation, the color of the transmitted light is sun-like and close to Planckian locus 31—first CCT, while the color of the scattered light is sky-like and in the bluish area III—second CCT. To provide for a difference between the first CCT and the second CCT resulting in the unique perception associated with the sun and sky at noon, the coordinates of the respective colors within the uniform chromaticity diagram may differ at least in the range from a Δu'v' of at least 0.008 such as at least 0.01, 0.02, 0.025, 0.03 or 0.04 such as 0.5 or more. For example, providing the second CCT in the range of or at least close to the Planckian locus 31 at about 10 000 K will result in a blue sky impression and the sun appearing at the first CCT in the range from 800 K to 6500 K.

In FIG. 5A, exemplary regions "Sun"/"Sky" are schematically indicated within the uniform chromaticity diagram. As will be explained below, associated points within the regions "Sun"/"Sky" represent an operation state associated with specific parameter settings of the diffuser unit. FIG. 5A illustrates the tunability of the first and second CCTs for a refractive index configuration similar to the E7/NOA65 scattering unit of FIG. 4B. Exemplarily, an OFF-state (OFF) and an ON-state (ON) are illustrated for the above discussed NOA65/E7 configuration at orthogonal incidence for the first CCT and the second CCT, wherein increasing the electric field decreases the total scattering cross section. It will be appreciated that different tuning directions may be set.

It is noted that artificial (unnatural) effects may be achieved by tuning the spectrum of the "to be scattered" light by moving it away from Planckian locus 31, thereby, for example providing a greenish background.

Figure 5C:
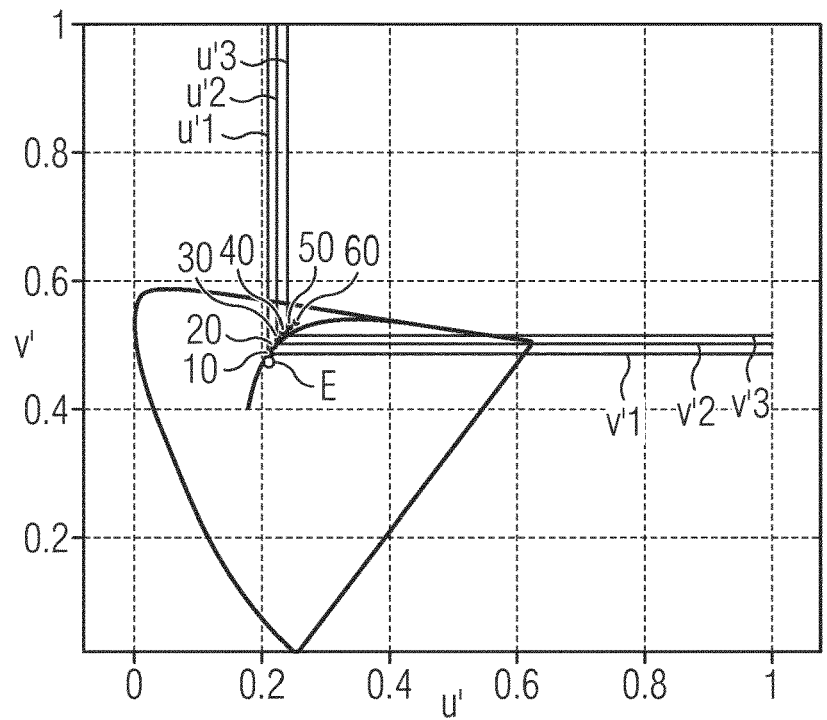
Figure 5D:
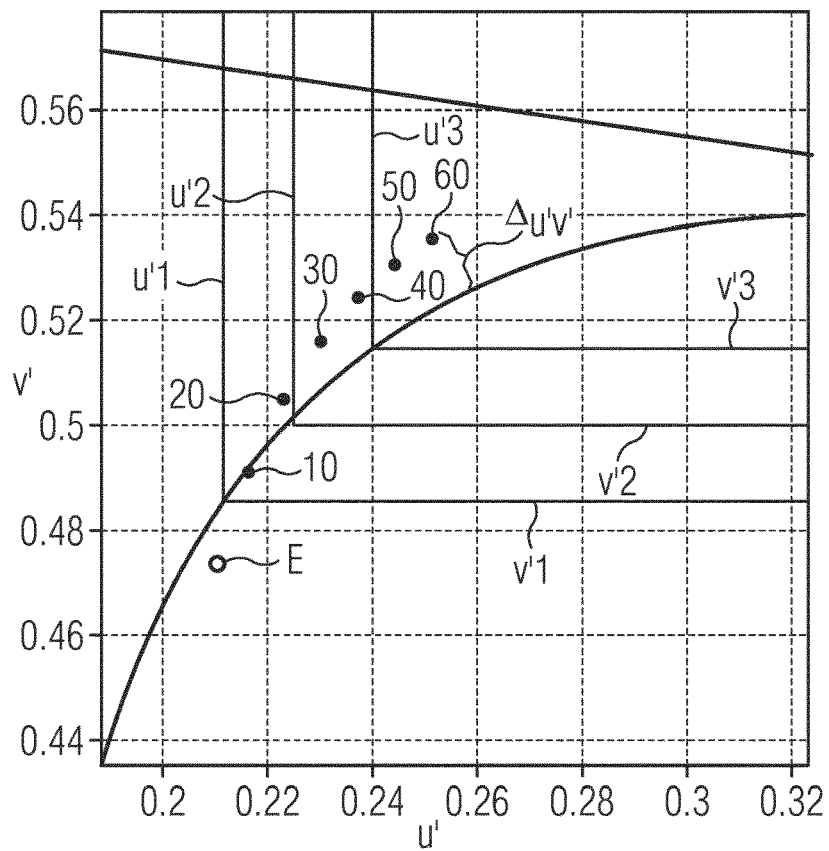

For a well-defined input light source such as the E standard illuminator (equal-energy radiator with a spectral power distribution (SPD) constant inside the visible spectrum), the uniform chromaticity diagrams of FIGS. 5B to 5D illustrate the chromatic changes in the perceived color of the transmitted direct light, each color perception being associated with a respective set transmittance of the diffuser unit, i.e. operation state. Thus, FIGS. 5B to 5D illustrate schematically the tunability of the first CCT for the transmitted directed light in more detail for an increasing electric field. Tuning the first CCT by scattering will affect also the second CCT.

As will be acknowledged in view of FIG. 5A, increasing the scattering activity moves the color of the transmitted light towards red and the blue of the diffused light towards white, while reducing the scattering activity whitens the transmitted light and intensifies the blue of the diffuse light. This is similar to the case for increasing/reducing the number of Rayleigh scatterers in nature. For example, increasing the index mismatch shifts the transmitted light to white-yellow (around a Planckian locus value of 6000K/5500K/5000K), to orange (around an Planckian locus value of 4000K/3000K), and to red (around an Planckian locus value of 2000K) and may at least for large scattering activity whitens the blue of the diffused light.

In the uniform chromaticity diagram of FIG. 5B, ten operating states with increasing electric field are illustrated based on respective u'v'-data points for the previously discussed PDLC film NOA65/E7, a LC droplets size of about 100 nm, a sample thickness 100 μm, and a filling ratio of about 50%.

It is assumed that the PDLC film is illuminated with an E standard illuminant under normal incidence (orthogonal incidence at 0°). The color point E illustrates the color associated to the E standard illuminant.

In the OFF state (color point OFF), maximum scattering is present (largest cross-section in FIG. 3, <n>). In the ON state (color point ON), minimum scattering is present (smallest cross-section in FIG. 3, no) is present. Accordingly, when increasing the electric field, the color points move (essentially) along the Planckian locus 31 towards the color point E. Accordingly, the color will change from an orange/yellow to the color associated to the color point E (which is similar to the D series illuminant with a CCT of 5455 K).

In the uniform chromaticity diagrams FIG. 5C and FIG. 5D (magnification of respective area of FIG. 5C), three reference color points are defined by lines u'1/v'1, u'2/v'2, u'3/v'3 given by the u'- and v'-values 0.212/0.485, 0.225/0.5, and 0.24/0.514, respectively. The reference color point are increasingly larger in their u'- and v'-values than the color point E (i.e. increase in their Euclidean distance to the color point E).

In addition, for the above PDLC film NOA65/E7 (LC droplets size of about 100 nm, in the OFF state), sample thicknesses of 10 µm, 20 µm, 30 µm, 40 µm, 50 µm, and 60 µm are illustrated by color points 10, 20, 30, 40, 50, and 60, respectively, again for assumed illumination with the E standard illuminant. Increasing the thickness changes the number N of nanoscale scattering elements per unit area assuming that the remaining parameters remained the same. One recognizes that the number N of nanoscale scattering elements per unit area associated to the above thicknesses are beyond (at larger values than) the respective lines u'2/v'2, u'3/v'3. Thus, for a scattering layer, the herein discussed parameters (maximum) relative refractive index, refractive index of the host material/the scattering elements, and effective size relates to a minimum number N of nanoscale scattering elements per unit area that is needed to create a color point beyond the above values. On the other side, the requirement that a dichroic illumination should be given, at least some regular transmitted light should maintain, which results in a maximum number N of nanoscale scattering elements per unit area and a respective u'-limit associated with a specific required minimum transmittance.

As further will be appreciated the number N of nanoscale scattering elements per unit area depends on the incidence direction associated with the impinging light resulting in the regularly transmitted light because in general, the scattering layer has a layer-like two-dimensional shape associated with a layer thickness. This applies also for curved layers in general. Thus, while for normal incidence, the desired number N of nanoscale scattering elements per unit area may not be reached, for some incident angle the desired number N of nanoscale scattering elements per unit area may apply and generate regularly transmitted light at a desired color point. In particular in the field of lighting systems using large area diffuser units, incident angles of up to about 60° such as 25°, 30°, or 45° usually are implemented.

Figure 6A:
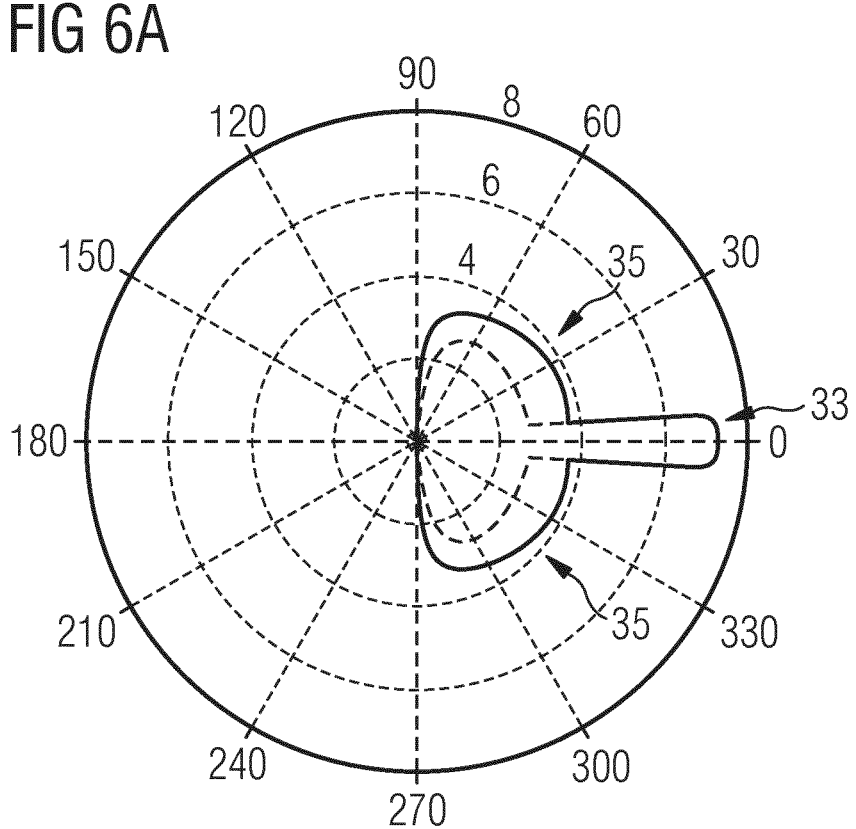

In FIGS. 6A (ON-state) and 6B (OFF-state), those chromatic effects are further illustrated using polar plots of the luminous intensity, i.e. the light power emitted from the diffuser unit in a particular direction per unit solid angle (weighted by the luminous efficiency functions and assuming normal incidence of the impinging white light onto an NOA65/E7-based diffuser unit). The behavior is representative for any type of white light illumination but is schematically indicated for an assumed illumination with a blackbody illuminator at a CCT of 6500K. The luminous intensity distribution depends on two angular coordinates wherein in the illustrated plots, the angular coordinate p is directed in an arbitrary selectable plane of incidence due to the assumption of an orthogonal incidence of a white light beam onto a planar diffuser unit. In the polar plots, the luminous intensity is illustrated in a logarithmic arbitrary scale for two wavelengths corresponding to a blue component (450 nm: through line) and a red component (600 nm: dashed line).

Specifically, one recognizes a directional light portion 33 and a diffused light portion 35. Directional light portion 33 still propagates in a direction of 0°, however, with an angular width of e.g. about 5°. In addition, the Rayleigh-like scattering resulted in the generation of diffused light portion 35 having a luminous intensity distribution that is indicated by a small half-circular-looking curve section at a reduced intensity.

Blue sky scattering conditions are illustrated in FIG. 6A showing primarily the blue component contributing to diffused light portion 35, while the directional light portion 33 (assuming a blackbody-like wavelength dependent intensity distribution) illustrates comparable contributions of the blue and red components.

Figure 6B:
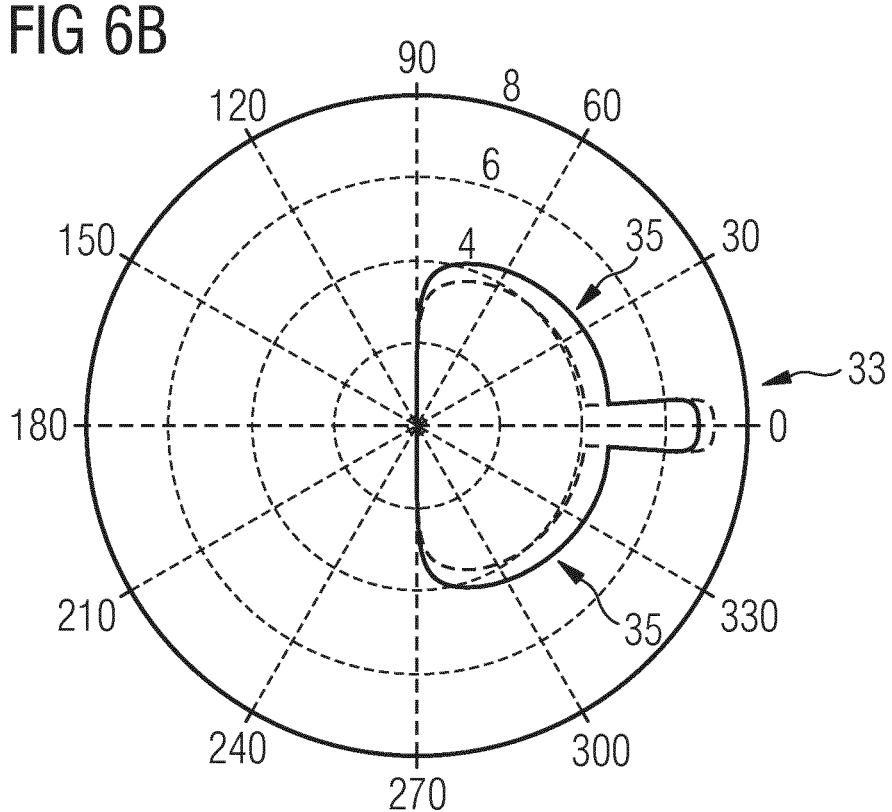

Referring to FIG. 6B, due to the increased scattering of the red component similar to the low sun scattering condition, the red contribution is significantly increased for diffused light portion 35. At the same time, the red component is relatively increased in directional light portion 33 because more blue light is scattered out. Accordingly, the sun appears more orange/red, while the blue of the sky appears more whitish.

It can be noted that the uniformity is increased in FIG. 6B with respect to FIG. 6A as the relative intensity differences between directed light and diffused light become smaller for increased scattering activity.

FIG. 6C illustrates schematically the behavior of the illuminance measured at points 12A and 12B, respectively, for the sun-like illumination in area 11 and outside thereof. One clearly sees that the difference of the illuminance values associated with those points can vary significantly, thereby allowing a spot like illumination as well as a uniform illumination of an ambience.

Moreover, although for example scattering of 90% of the direct light may be achieved, the depth perception can be maintained when looking onto the device because the clarity is maintained by Rayleigh-like scattering. In other words, despite the low luminance of a red sun, one still can perceive the source at infinity accompanied by those effects discussed in the above cited disclosures for a blue sky situation.

It is again noted that—assuming an anisotropy in the index of refraction and an at least partial alignment of the LCs—a similar effect in the appearance is created when the direction of the directional light portion 33 is varied or the polarization state is varied. Exemplary PDLC films for the angle type or polarization type tuning approaches may be based on e.g. E7 LC droplets embedded in a NOA65 or NOA1315 polymeric film.

FIGS. 7A to 7G illustrate schematic cross-sections for liquid crystal droplet based scattering units. FIG. 7H illustrates an inverted concept in which static scattering centers (nanoparticles) are embedded in a liquid crystal based host material. FIG. 7I illustrates a liquid crystal droplet based scattering unit in-between PET layers and FIG. 7J such a PET-PDLC configuration within a glass sandwich structure.

FIG. 7A illustrates again the basic setup that was already illustrated e.g. in FIG. 2A. In-between two ITO glass sheets 23—as examples of conducting and at least at one side transmitting cover layers—scattering is performed with layer 17 that comprises, as scattering elements/centers, LC nanodroplets 19 embedded within host material 21.

Figure 7A:
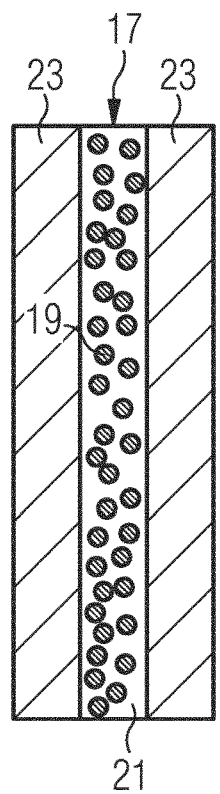
FIGS. 7A to 7J show schematic cross-sections of LC nanodroplets based diffuser units.
Figure 7B:
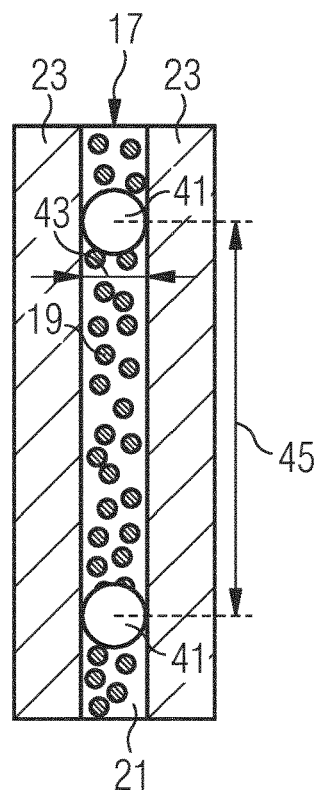

In the embodiment of FIG. 7B, spacer elements 41 are included in layer 17 to provide for a defined layer thickness 43 of layer 17 between the two, for example, rigid cover sheets. E.g. ITO glass as a cover sheet is sufficiently stiff to allow for an average distance 45 between elements that does not essentially affect the visual perception. In general, examples of spacer elements 41 include polymeric or glass beads. Moreover, a spacer grid or spacer net can be used, where the base shape is, for example, adapted to any underlying structural features of the lighting system such as of the light source. Using spacer elements 41 allows reducing the layer thickness 43 and thus lowers the voltage needed to be applied to achieve a desired electric field across layer 17 (e.g. operating with a standard 220 V AC-Voltage).

Moreover, using spacer elements 41 allows an increase of the uniformity of the optical properties of layer 17 due to a more homogeneous thickness and thus scattering element distribution in the plane of layer 17. However, the density of the spacer elements 41 should be low enough so that their presence itself does not affect the visual appearance.

Figure 7C:
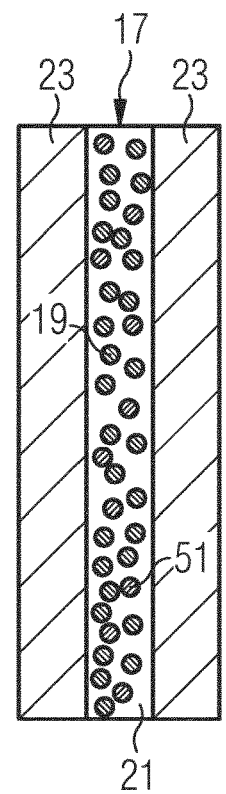

In the embodiment of FIG. 7C, "static" scattering elements 51 are included in layer 17 to provide additional scattering features that are independent of, for example, the applied electric field or the incident direction of the light. The amount of static scattering elements 51 may be, for example, selected to provide for a homogeneous scattering feature in the desired degree across the scattering unit. Static scattering elements 51 can be sized in the nanoscale to provide a constant base of Rayleigh-like scattering. Alternatively or additionally, static scattering elements 51 can be sized in e.g. the microscale to provide a large particle diffuse scattering for smearing out any structure of the light intensity distribution across the "to be scattered" light beam. In general, examples of static scattering elements 51 include organic or inorganic particles.

Figure 7D:
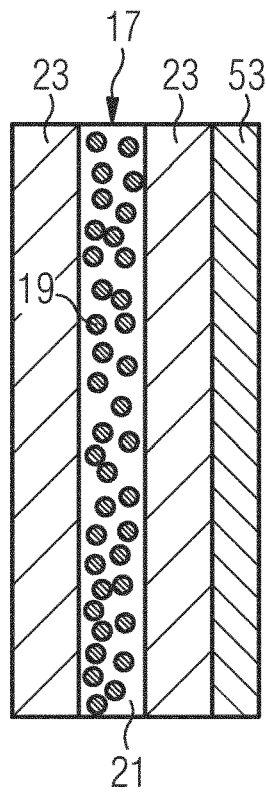

An alternative approach for providing additional static scattering features is illustrated in FIG. 7D. Specifically, an e.g. diffusing layer 53 is added to the outer surface of one of the cover sheets (or to both cover sheets—or as a separate layer in-between—or with different scattering features within one or separate diffusing layers). For example, diffusing layer 53 may provide a constant base of Rayleigh scattering and/or a large particle diffuse scattering similar to the embodiment of FIG. 7C, using e.g. respective static scattering elements 51 embedded in a supporting matrix.

Figure 7E:
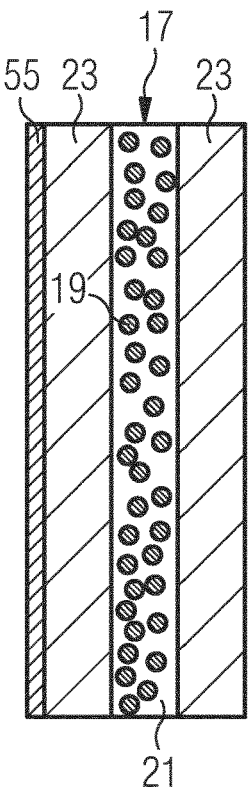
Figure 7F:
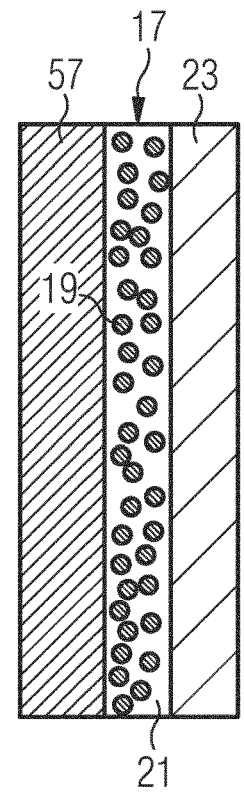

While the embodiments of FIGS. 7A to 7D are intendent to be used in transmission, the embodiment of FIGS. 7E and 7F are used in reflective configurations. For example, as schematically illustrated in FIG. 7E, a reflective layer 55 is provided at one of the cover sheets. Accordingly, light impinging on the other cover sheet will pass twice through layer 17, once before and once after reflection at reflective layer 55.

In the embodiment of FIG. 7F, one of the cover sheets is configured itself as a reflective sheet 57. In that case, reflective sheet 57 may be further configured to act as an areal electrical contact.

Assuming that the refractive index configurations allow a transmission mode, the configurations of FIGS. 7E and 7F may, in addition to the tunable sun-sky-perception, comprise in the transmission mode the function of a conventional mirror and, thus, form a switchable mirror that can be used as a conventional mirror or as a part of a lighting system installation.

Figure 7G:
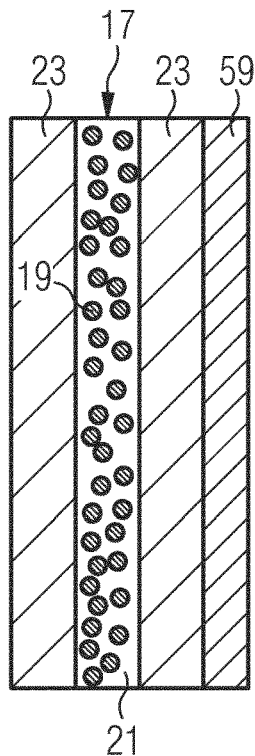
Figure 7H:
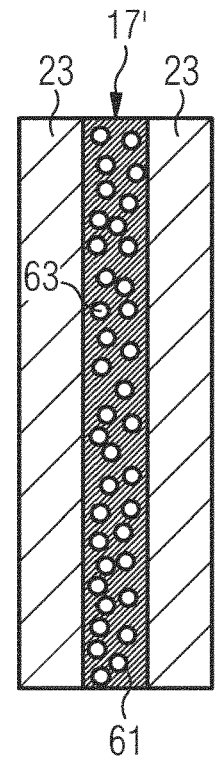
Figure 7I:
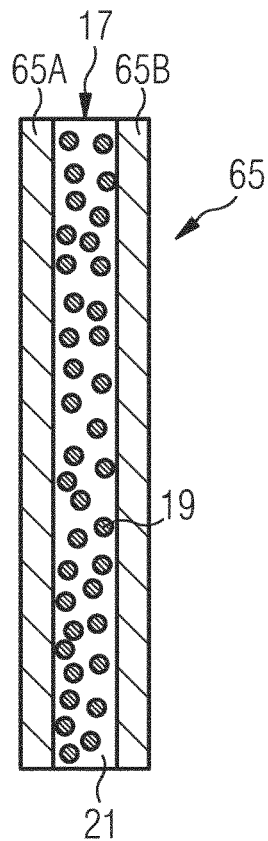

In the embodiment of FIG. 7G, an absorbing layer 59 is added to the outer surface of one of the cover sheets (or at both cover sheets or as a separate layer in-between or with different absorbing features within one or separate diffusing layers). For example, absorbing layer 59 may provide UV and/or IR absorption. Respective scattering units may in particular be suited for use outside. In addition, it is possible to introduce UV and/or IR absorbing species directly in the starting mixture of pre-polymer and LCs.

While the embodiments of FIGS. 7A to 7G are based on providing the LCs in nanodroplets, the embodiment of FIG. 7H provides the LCs in their liquid form as the host material 61 in which "static" nanoscale scatterers 63 are embedded. The optical aspects disclosed above for the LC nanodroplets similarly apply in that configuration.

As illustrated in FIG. 7I, PET film based diffuser units 65 use plastic flexible conductive transparent films (e.g. ITO PET films 65A, 65B) to define layer 17. The thickness of layer 17 may be defined by adding again, for example, some spacer elements (not shown). This may allow producing diffuser window elements 67 as shown in FIG. 7J, in which the final PDLC diffuser unit is a PDLC film sandwiched between two e.g. ITO PET films 65A, 65B that is then stratified between two glass sheets 67A, 67B.

The skilled person will acknowledge that the exemplary modifications of the basic setup as discussed in connection with FIGS. 7A to 7J may generally be combined to provide a combination of additional optical features (defined thickness, additional scattering, absorption, reflection) within a scattering unit. Moreover, added features may be provided by a single added element (e.g. an absorbing spacer element). Furthermore the device can have additional optical features such as etched, anti-glare, anti-reflection surface.

In general, the size of the diffuser unit may extend for large area lighting systems over closed areas of e.g. 1 m×2 m or more, thereby providing a large continuous sky-imitating area. For tile structure based lighting systems, the diffuser unit may extend over closed areas in the range of about 10 cm×10 cm corresponding e.g. to a single tile.

Figure 7J:
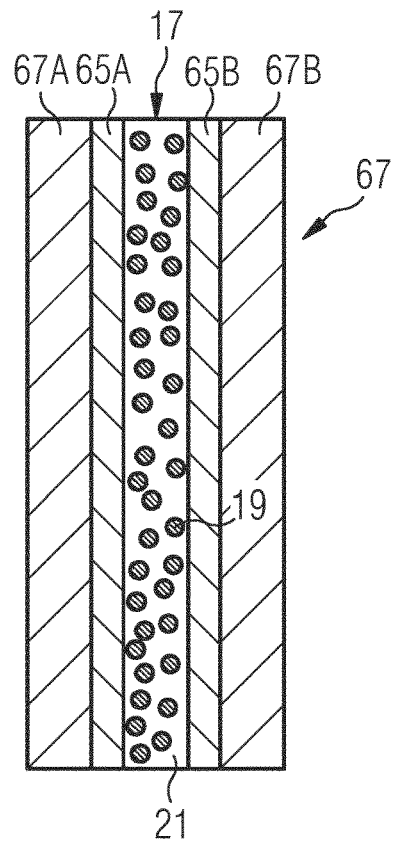

In particular referring to FIGS. 7I and 7J, ITO-PET-supporting films for sandwiching the PDLC layer can be produced with standard processes, thereby creating long rolls of film-type based material for large scale diffuser units. On the other side, referring to e.g. FIG. 7A, ITO-glass sheets for sandwiching the PDLS-film can be used for smaller scale diffuser units.

The formation of a polymeric network with LC nanodroplets inclusion can be achieved by means of different technique that can be adopted depending on the chemical properties of the selected materials. In case of a high solubility of the liquid crystal in the starting pre-polymer (or monomer) it is convenient to induce a phase separation. This technique is known as polymerization induced phase separation (PIPS) and commonly occurs when a homogeneous mixture of pre-polymer and liquid crystal (LC) undergoes a polymerization process. Once the polymerization has initiated, LC molecules spontaneously separate from the incipient polymer matrix leading to nucleation and growth of confined droplets. The final size of these droplets depends essentially on the polymerization rate. In general, the faster the process the smaller the resulting droplets.

Beside the polymerization rate, there are additional factors such as the relative concentrations of materials, the types of liquid crystal and polymers used, and various other physical parameters, such as viscosity and temperature, that contribute to the final droplet size.

It is possible to activate the polymerization process in different ways such as condensation reactions in the case of epoxy resin, a radical initiators (BPO, AIBN) based reaction when vinyl groups are involved, and a photoactive molecules based reaction that generate radical species when exposed to specific radiation (gamma rays, UV-visible light, and/or IR-radiation), the latter being also referred to as photopolymerization.

UV initiated polymerization is considered particularly suitable for generating nanoscale droplets because the rate of the polymerization can be modulated by changing the light intensity. This leads to important advantages with respect to the other technique, as it is possible to achieve a higher control of the droplet size that can be varied with good uniformity in a size range from 50 nm up to 20 µm.

Figure 8:
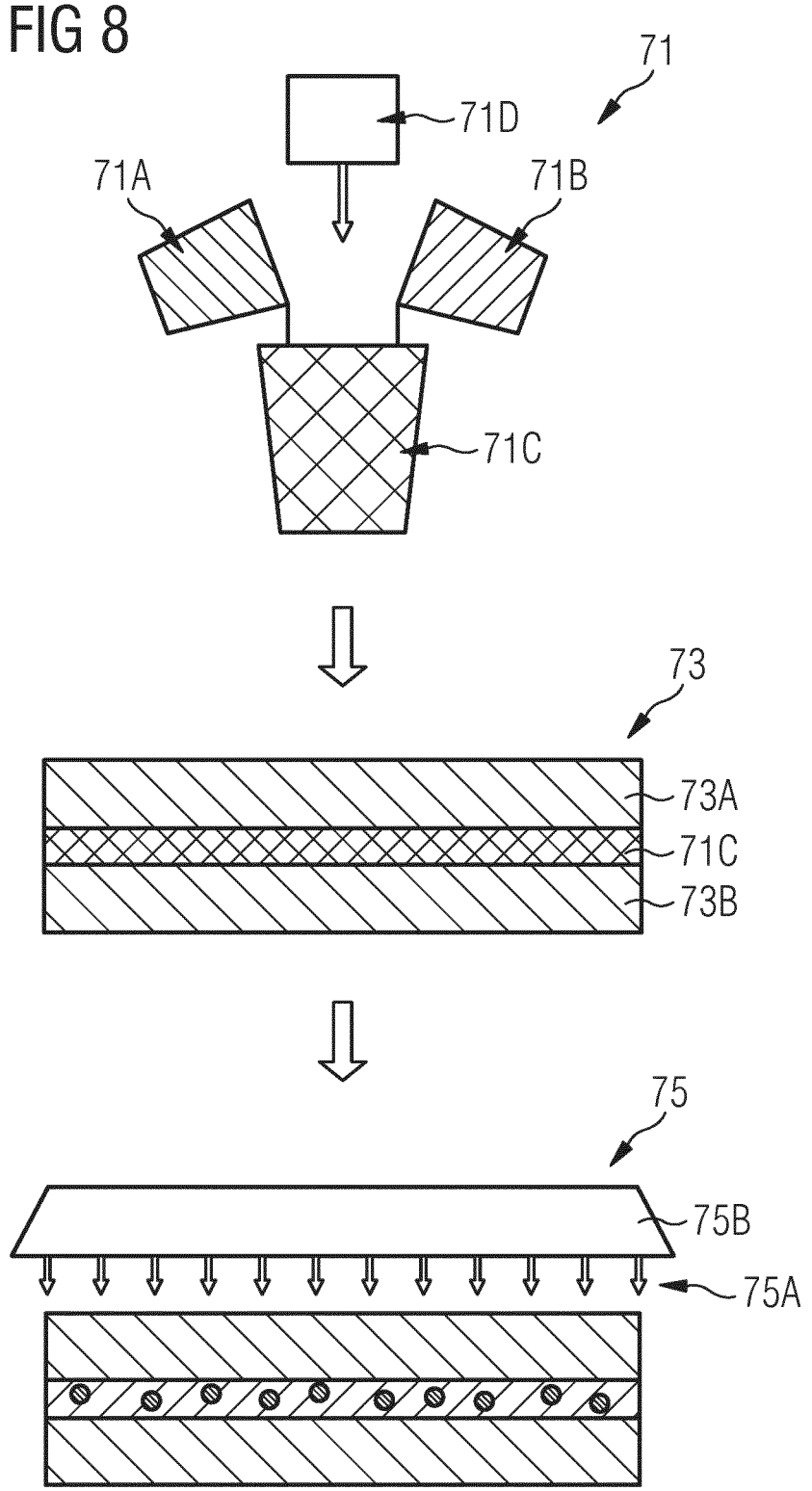
FIG. 8 illustrates schematically a process for producing a LC nanodroplets based diffuser unit.

FIG. 8 illustrates schematically an exemplary production process for forming a thin homogeneous scattering layer between two sheets using photopolymerization.

The process generally starts with a mixing step 71 for mixing needed components such as LCs 71A and pre-polymer 71B, thereby forming a pre-polymer-LC-mixture 71C. It continues with a lamination step 73 of pre-polymer-LC-mixture 71C in-between sheets 73A, 73B, thereby forming a sandwich-type base structure of the scattering unit. The process completes with a UV curing step 75 based on UV light 75A that homogeneously generated with a large area UV illumination source 75B and illuminates the sandwich-type base structure such that pre-polymer-LC-mixture 71C transitions into PDLC layer 17 with nanoscale LC droplets (nanodroplets 19) phase-separated therein.

Mixing step 71 defines the volume fraction $V_{LC}/V_{total}$. In general, in order to achieve phase separation, the volume fraction of LC may be in the range from 20% to 70%. Mixing step 71 may further include a step of adding further elements 71D discussed above in connections with FIGS. 7A to 7H. Referring to FIG. 7B, one may add during the production process, spacer elements 41 such as transmitting nanospheres of a size of some micrometers to the mixture of liquid crystals and the base polymer, thereby defining an effective layer thickness by the (large) µm-particles.

Lamination step 73 defines the film thickness, for example in the range from 10 µm to 500 µm, and thereby the final areal density of the scattering elements: $N_{LC}/m^2$. Instead of spacer elements, a mask may act as a spacer e.g. when sheets are used that are sufficiently stiff over the voids in the mask. The mask may be adapted in shape to a light source comprising a plurality of light source elements.

UV curing step 75 initiates the polymerization induced phase separation. As said, the resulting size of the liquid droplets depends on the UV light intensity, the intrinsic curing rate, and the volume fraction: $V_{LC}/V_{total}$. UV light intensities are, for example, for E7/NOA65 based PDLC films in the range from 40-600 mW/cm$^2$.

Figure 9A:
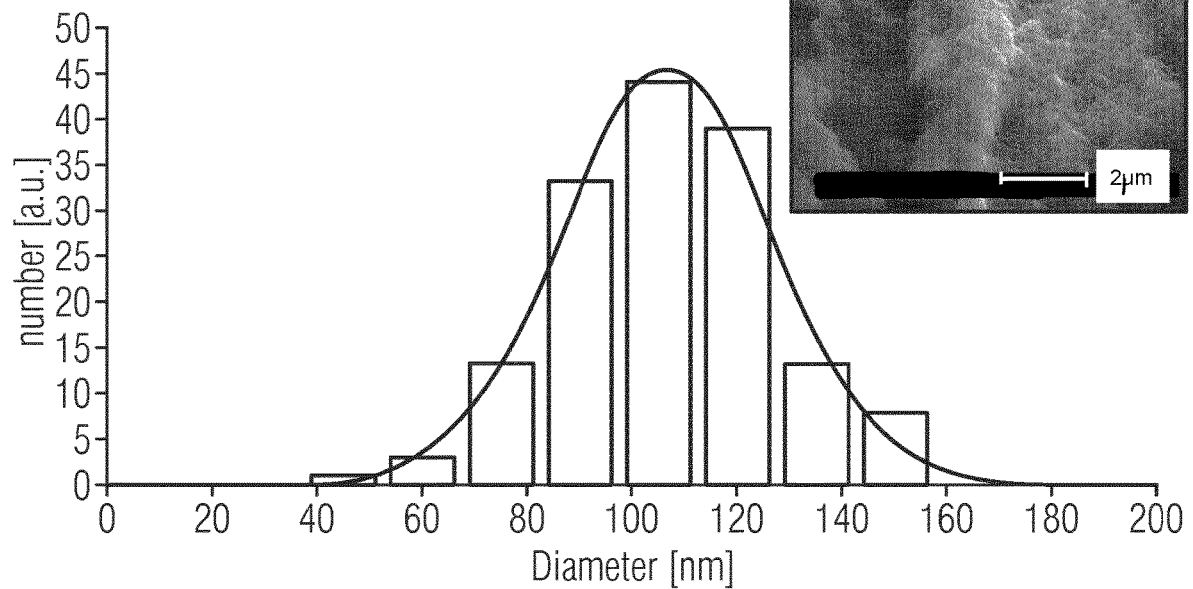
FIGS. 9A and 9B are schematic plots of size distributions and respective SEM images.
Figure 9B:
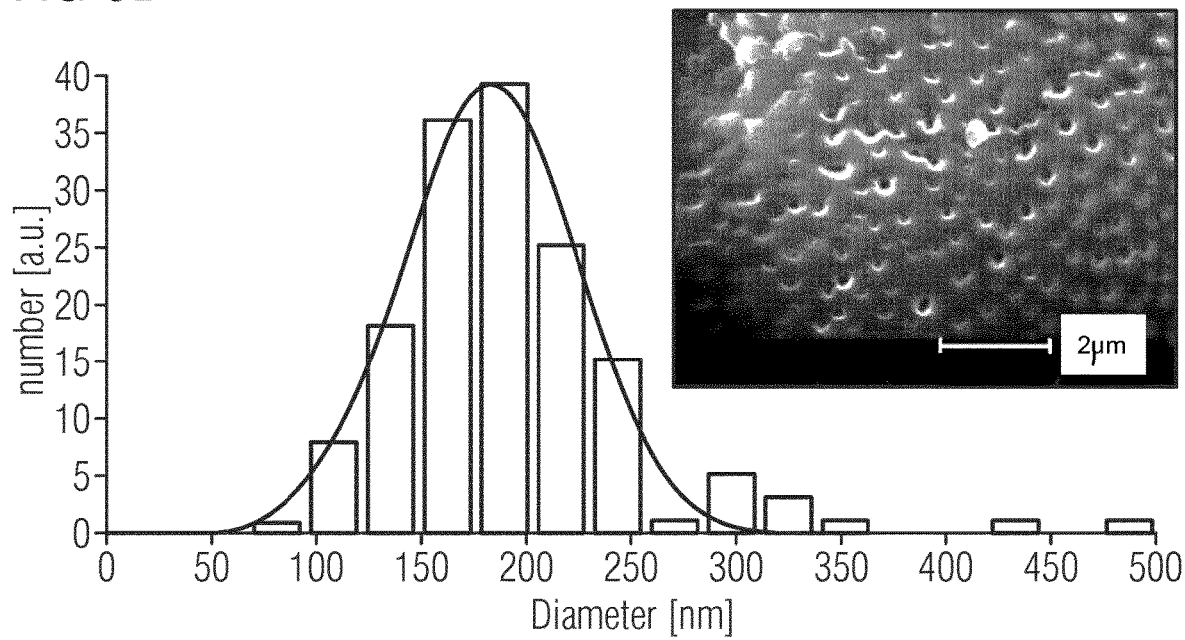
Figure 10A:
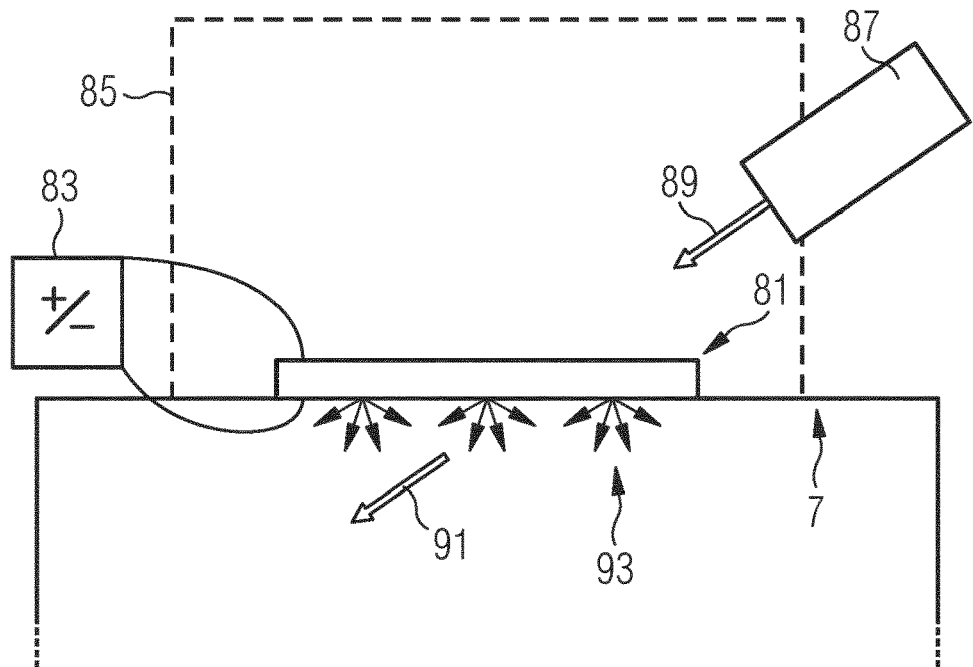
FIGS. 10A and 10B are schematic illustrations of exemplary lighting systems using tunable diffuser units in transmission and reflection, respectively.
Figure 10B:
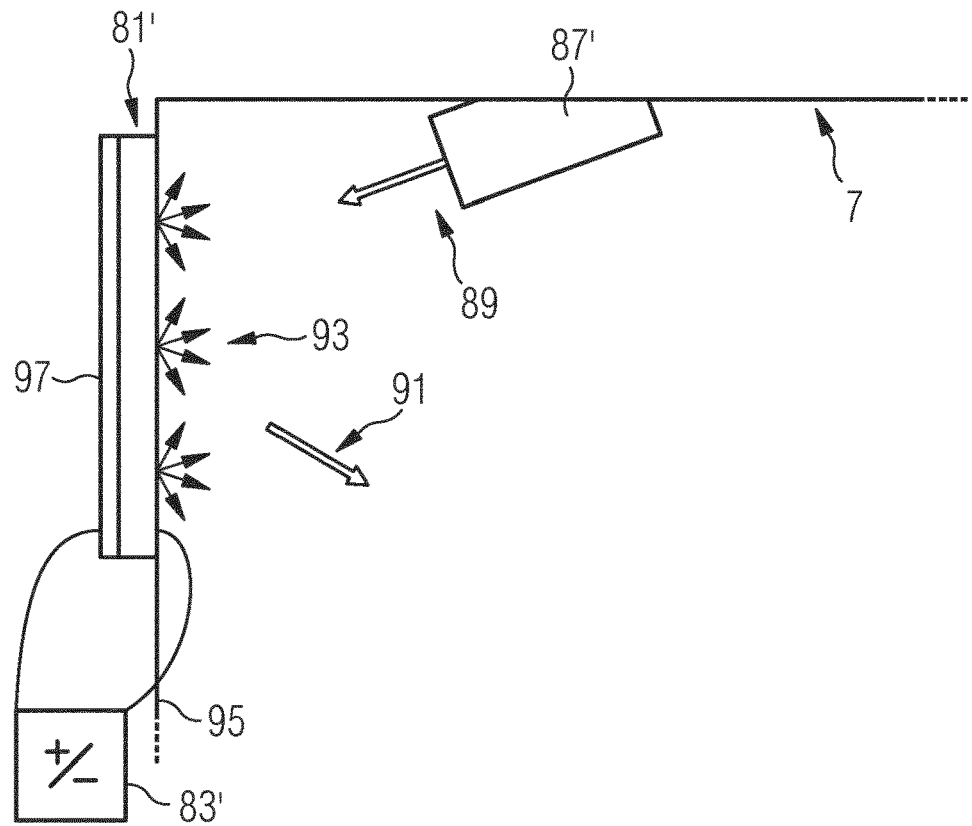

FIGS. 9A and 9B illustrate nanoscale structures of nanodroplets made of E7 in an NOA65 host material that form together a LC based Rayleigh diffuser. Using a UV photopolymerization as described above, nanodroplets distributions with a mean size of about 100 nm (FIG. 9A) and 200 nm (FIG. 9B) were produced as can be seen from respective diameter distribution plots measured from the reproduced SEM images. It is noted that the diameter distributions are quite narrow around the mean size, indicating the homogeneous formation process and the controlled end of phase separation. Thus, as the phase separation process can be well controlled and, thus, be limited in time, essentially only one size of nanodroplets is formed. As can be seen from FIGS. 9A and 9B, essentially no droplets in the µm-size range are generated in a respective photopolymerization process.

As will be acknowledged by the skilled person, essentially only Rayleigh-like scattering will take place with the illustrated diameter distributions of nanodroplets.

Other techniques that can be used to prepare PDLC are thermal induced phase separation (TIPS) and solvent-induced phase separation (SIPS). In TIPS the liquid crystal is mixed with a thermoplastic polymer (e.g. PMMA) at a temperature above the polymer melting point. By cooling this homogeneous mixture, phase separation occurs and droplets remain entrapped inside the polymeric matrix. The size of the resulting droplets is mainly dependent on the cooling rate. Conversely, in SIPS the liquid crystal and the thermoplastic polymer are dissolved in the same solvent creating a single phase mixture. In this case, phase separation is induced by solvent evaporation that determine the droplet size. If required it is possible to increase the working temperature in order to increase the evaporation rate and thus decrease the particles size.

Another method used for producing PDLC is the one based on emulsion. In this case LC are emulsified with an aqueous solution of a film-forming polymer. This emulsion is deposited on a conductive substrate and allowed to dry. During this process, the polymer forms a solid phase containing LC droplets that commonly have an elongated shape due to shrinkage of the original film. Examples of this method use a water solution of polyvinyl alcohol and nematic LC.

Several different types of liquid crystals (LC) can be considered suitable for the aspects disclosed herein. In principle, there is a large variety of LCs commercially available. A leading company in the LC field is Merck KGaA (Germany). Typical classes of useful liquid crystal for this invention may include but are not limited to cyanobiphenyls and fluorinated compounds. Cyanobiphenyls can be mixed with cyanoterphenyls and with various esters. A commercial example of nematic liquid crystals belonging to this class is "E7" (Licrilite® BL001 from Merck KGaA). E7 is a mixture of 51% 4'-n-pentyl n-cyanobiphenyl (5CB), 21% 4'-n-heptyl-n-cyanobiphenyl (7CB), 16% 4'-n-octoxy-4-cyanobiphenyl, 12% and 4'-n pentyl-4'-n-pentyl-4-cyanoterphenyl. The mixture has a crystal to nematic phase transition temperature of −10° C. and a nematic to isotropic transition temperature of 60° C.

Further examples of commercial liquid crystal are: E31, E44, E63 for mixtures of LCs; K12, K21, K24, M15, M18, M24 for single component LCs. Other useful examples of liquid crystal mixtures (e.g. available from Merck KGaA) include BL003, BL004, BL009, BL011, BL012, BL032, BL036, BL037, BL045, BL046, ML-1001, ML-1002, and the series of mixtures including fluorinated compound TL202, TL203, TL204, TL205, TL215, TL216 which have a remarkably high birefringence. Liquid crystals available from other companies include e.g. TOTN404 and ROTN-570 by Hoffman-LaRoche, Switzerland.

Referring to the addition of further elements 71D in mixing step 71, surfactants may be added that include molecules that localize on a droplet's surface between the polymer and the LCs and thereby increase the mobility of the LC molecules to align with the electric field. Accordingly, surfactants may allow decreasing the saturation voltage.

Herein, in the context of polymerization, the term "pre-polymer" refers to any kind of polymer precursor able to form a polymer as the host material of the liquid crystal droplets. It can be, for example, a monomer, an oligomer, a short chain polymer or a mixture of this three component. For TIPS and SIPS, it can also be a polymer in liquid state that it is induced to solidify. Suitable pre-polymers for the present invention are precursors able to form a polymer having excellent optical transparency. It can be selected from thermoplastic, thermosetting and photocurable resins. Suitable pre-polymers may belong (but are not limited) to the following categories: esters, aldehydes, phenols, anhydrides, epoxides, acrylates, vinyls, alkenes, alkynes, styrenes, halides, amides, amines, anilines, phenylenes, aromatic hydrocarbons, and siloxanes. In addition, fluorinated polymer precursor may be used. A wide variety of commercial useful pre-polymers are available such as adhesives of the NOA series from Norland optics Inc. and UV curable adhesives and sealants from Croda International Plc. or Henkel AG & Co. KGaA.

Referring to e.g. FIG. 2B, cover sheets provide in some embodiments an areal electrical contact as close as possible to the LC droplets. Specifically, it was exemplarily referred to ITO glass sheets 23. ITO glass sheets 23 are an example of known sheets using transparent conducting oxides (TCOs) as electrode elements, providing transmission in the visible spectrum of at least 90%. Together with the glass sheet, a structural template can be formed, which even may form a diffusion barrier. Desirable characteristics of TCO materials in the present embodiments include a high optical transmissivity across a wide spectrum, in particular the visible spectrum, and a low resistivity.

FIGS. 10A and 10B illustrate lighting systems using the tunable diffuser units in transmission and reflection, respectively. It is referred to the above mentioned disclosures by the applicant for more detail such that herein the disclosure is limited to the general principles.

FIG. 10A illustrates a schematic cross-section of a lighting system as shown in FIG. 1A. Specifically, in ceiling 7, a tunable nanodiffuser unit 81 is installed and electrically connected to a control and power unit 83. Control and power unit 83 is configured to initiate an electric field across the scattering layer to affect the scattering cross-section of respective scattering elements. E.g. within a dark box 85, a light source 87 is mounted to illuminate (directly or over light guiding elements) the scattering layer of tunable nanodiffuser unit 81. Schematically, in FIG. 10A a white light beam 89 is illustrated that is at least partly transmitted and exits tunable nanodiffuser unit 81 as transmitted light beam 91. In addition, if an operation state is selected by control and power unit 83 that results in Rayleigh scattering, also diffuse light 93 will be emitted from tunable nanodiffuser unit 81.

FIG. 10B illustrates a schematic cross-section of a lighting system using a reflective tunable nanodiffuser unit 81' as shown in e.g. FIGS. 7E and 7F. Specifically, in a wall 95, reflective tunable nanodiffuser unit 81' is installed and electrically connected to a control and power unit 83'. Control and power unit 83' is also configured to initiate an electric field across the scattering layer to affect the scattering cross-section of respective scattering elements.

A light source 87' is mounted at ceiling 7 to illuminated in this exemplary case directly the scattering layer of tunable nanodiffuser unit 81'. As in FIG. 10A, direct white light beam 89 is emitted from light source 87' and is at least partly transmitted through the scattering layer of reflective tunable nanodiffuser unit 81'. Then, in contrast to the embodiment of FIG. 10A, any light falling onto a mirror layer 97 of reflective tunable nanodiffuser unit 81' (e.g. reflective layer 55 or reflective sheet 57 of FIGS. 7E and 7F, respectively) is reflected back into the scattering layer of reflective tunable nanodiffuser unit 81', and interacts again with the scattering elements before exiting as transmitted light beam 91 and diffuse light 93.

As mentioned above, a plurality of scattering conditions can be set by control and power unit 83 including even a clear mirror operating state assuming that a transmission mode exits for the tunable nanodiffuser unit 81'.

For the chromatic aspects and tunability of transmitted light beam 91 and diffuse light 93, it is referred to in particular the above description in connection with FIGS. 5A to 6B.

Figure 11:
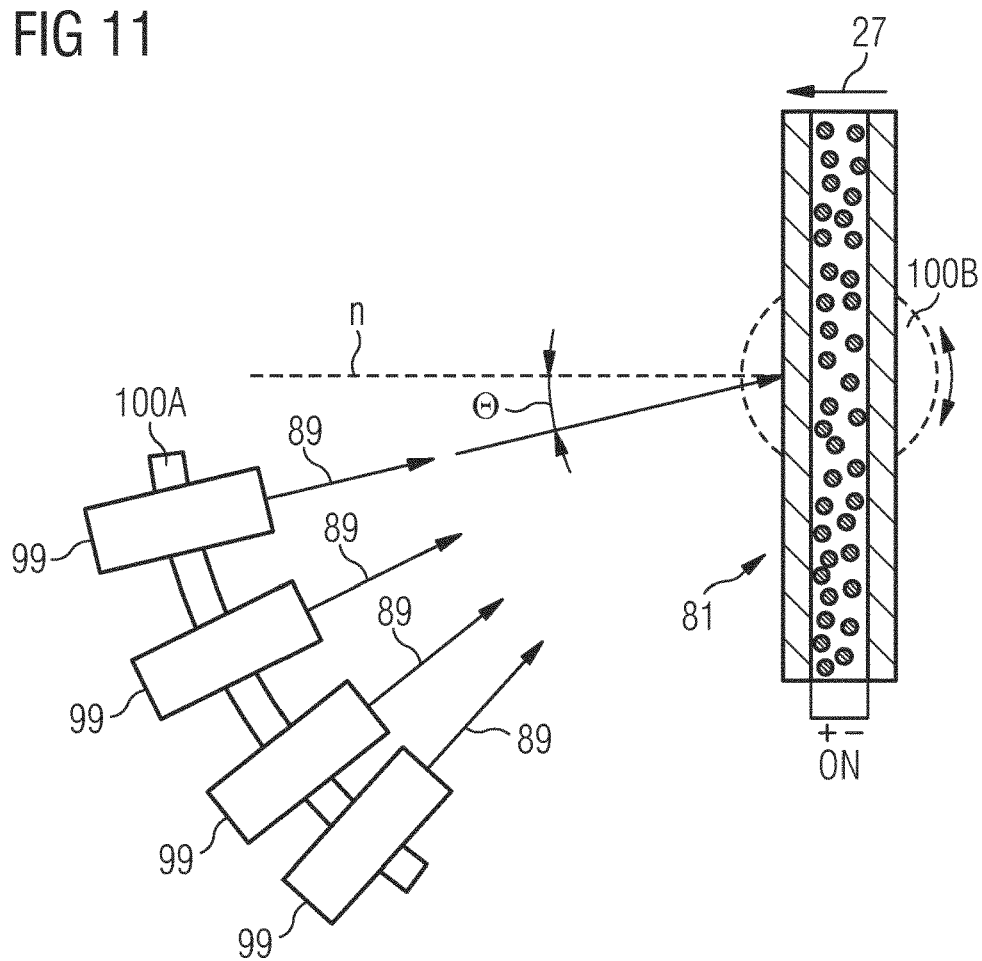
FIG. 11 is a schematic illustration of operating a lighting system with a movable source for chromatically tuning the light interaction with aligned LC nanodroplets.

FIG. 11 illustrates schematically a further lighting system configuration using tunable nanodiffuser unit 81, for example, in transmission as shown in e.g. FIG. 10A. Tunable nanodiffuser unit Si is electrically connected to a control and power unit configured to initiate an electric field across the scattering layer.

However, in this embodiment, the tuning of the scattering cross-section of respective scattering elements is, due to a movement of the light source, i.e. a change in the incidence direction of white light beam 89. Exemplarily, four positions of a light source 99 are schematically indicated in FIG. 11. Specifically, the lighting system may comprises one or more "change in the incidence direction" mounting systems such as a mount structure 100A for moving light source 99 with respect to nanodiffuser unit 81. Alternatively or in addition, an optical element (e.g. a folding mirror) may be turned to change the angle of incidence with a mount structure. Furthermore, in addition or alternatively, nanodiffuser unit 81 may be turned with respect to the incident light e.g. by a rotation stage 100B as a further example of a "change in the incidence direction" mounting system (schematically indicated in FIG. 11).

Due to the change of incidence direction, the contributing effective extraordinary refractive index $n_{eff}$ varies. Accordingly, the (effective) birefringence $\Delta n = n_{eff} - n_o$ results in a different applicable refractive index mismatch for different incidence angles (see disclosure in connection with FIG. 3). Thus, by moving the light source, the scattering conditions are modified in a manner similar to the above described tunability of the transmittance and the chromatic aspects onto the directional light and diffused light portions. For completeness, it is noted that in the OFF state, i.e. random orientation of the LCs, no dependence of the chromatic scattering effects on the incidence angle will be observed. Thus, for this moving light source concept, at least some alignment of the LCs is required.

Figure 12:
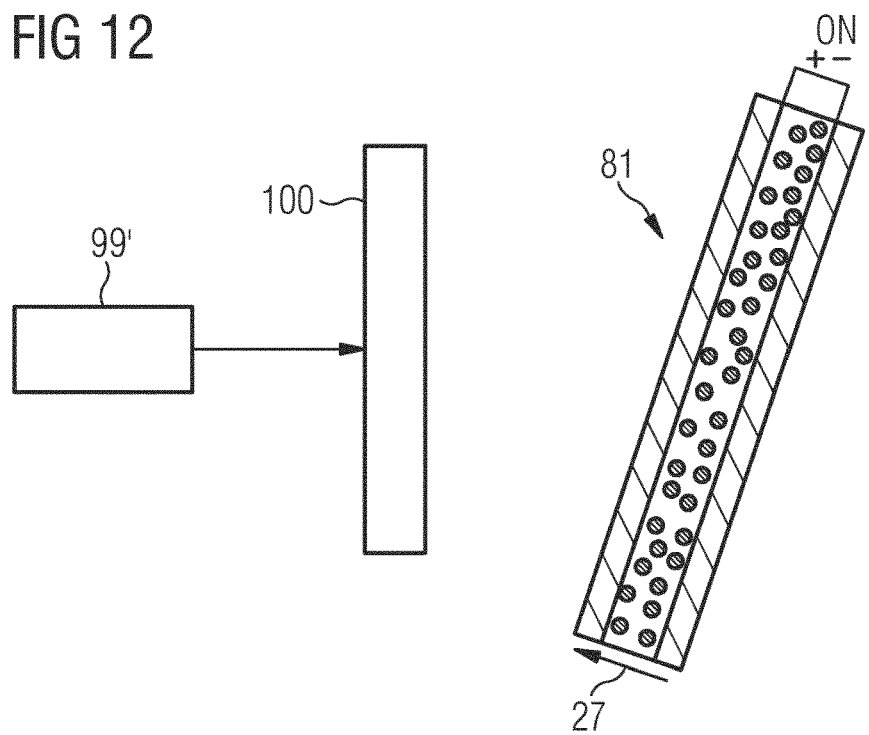
FIG. 12 is a schematic illustration of operating a lighting system for chromatically tuning the transmittance with polarization state variations for tilted incidence.
Figure 13:
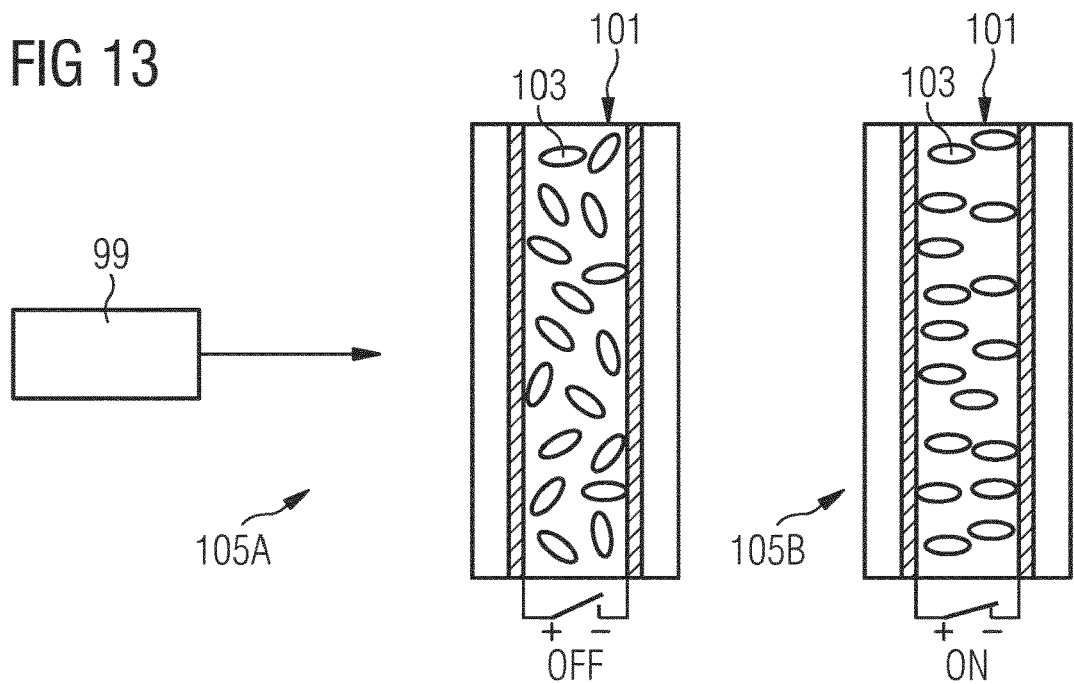
FIG. 13 is a schematic illustration of operating states of a diffuser with asymmetrically shaped scatterers for chromatically tuning the transmittance.

FIG. 12 is a further embodiment using tunable nanodiffuser unit 81 that allows tuning of the scattering effect, however, in this case by changing the polarization of the incident light. For example, the lighting system comprises a white light source creating at least partly polarized light and a polarizer 100 such as a wave plate for changing the polarization e.g. between p- and s-polarization states. Also, for the polarization based tuning, at least some alignment of the LCs is required (see also disclosure in connection with FIG. 3). To ensure that the extraordinary refractive index contributes, the incident light further is inclined with respect to the optical axes of the LC as schematically illustrated in FIG. 12. As explained above, changing the polarization state will change the overall index of refraction seen and thus result in the above described tunability of the transmittance and the chromatic aspects onto the directional light and diffused light portions as described above.

FIGS. 13 and to 14 relate to embodiments that use scattering elements having an anisotropy in the geometric shape within a diffuser unit 101. The anisotropy in the shape creates different scattering conditions for different incidence directions on each scattering element because the contributing effective particle diameter D changes.

Various anisotropic particles are know that adjust their orientation when an external electric field is applied. Anisotropic particles can be organic or inorganic. Exemplary organic particles include, for example, halides such as polyhalides or metal halides. Inorganic particles include, for example, compound materials such as bismuth oxychloride, graphite, lead hydrogenphosphate, or metals such as silver, tantalum, titanium or metal oxide such as tin oxide or vanadium pentaoxide. Anisotropic particles may have shapes often referred to as rod, needle, or flake shape. In general, the shape is "anisometric" and therefore, the shape of the particles is such that in one orientation intercept more/less light than another orientation. For the applications discussed herein, the anisotropic particles may be selected to transmit a desired wavelength range of the visible spectrum (preferably be essentially non-absorbing) and to have sizes in the range of, for example, about 200 nm.

The embedding material allows the reorientation of the anisotropic particles. Exemplary embedding materials include liquid dielectric substances with good insulation properties and with a suitable viscosity able to guarantee the Brownian motion and preventing particles sedimentation. Typical suspending media are polymeric liquids with medium/high molecular weight such as organo siloxane based materials. For example, organic particles with an elongated shape may be embedded in a liquid phase material. Subject to an electric field, respective re-orientation of the particles can take place, thereby allowing the control of the incidence direction in average.

FIG. 13 illustrates an arbitrary orientation 103A of elongated particles 105 (OFF state 105A) and an aligned orientation 103B of elongated particles 105 (ON state 105B), depending on applying or not-applying an electric field across diffuser unit 101. When being illuminated by a white light source 99, the optical tuning effects are similar to the effects described in connection with FIGS. 2A, 2B, and 3.

In brief, the extent of alignment affects the seen effective nanoparticle size and accordingly the scattering efficiency. For the exemplary nanoscale elements, in the ON state, under orthogonal incidence, the smallest size is seen by the incident white light from light source 99 and accordingly, the total scattering cross section is minimal. In other embodiments, the total scattering cross section may be maximal in the aligned state. Thus, applying an electric field allows tuning the transmittance similar to the tuning by the alignment of the LCs.

Figure 14:
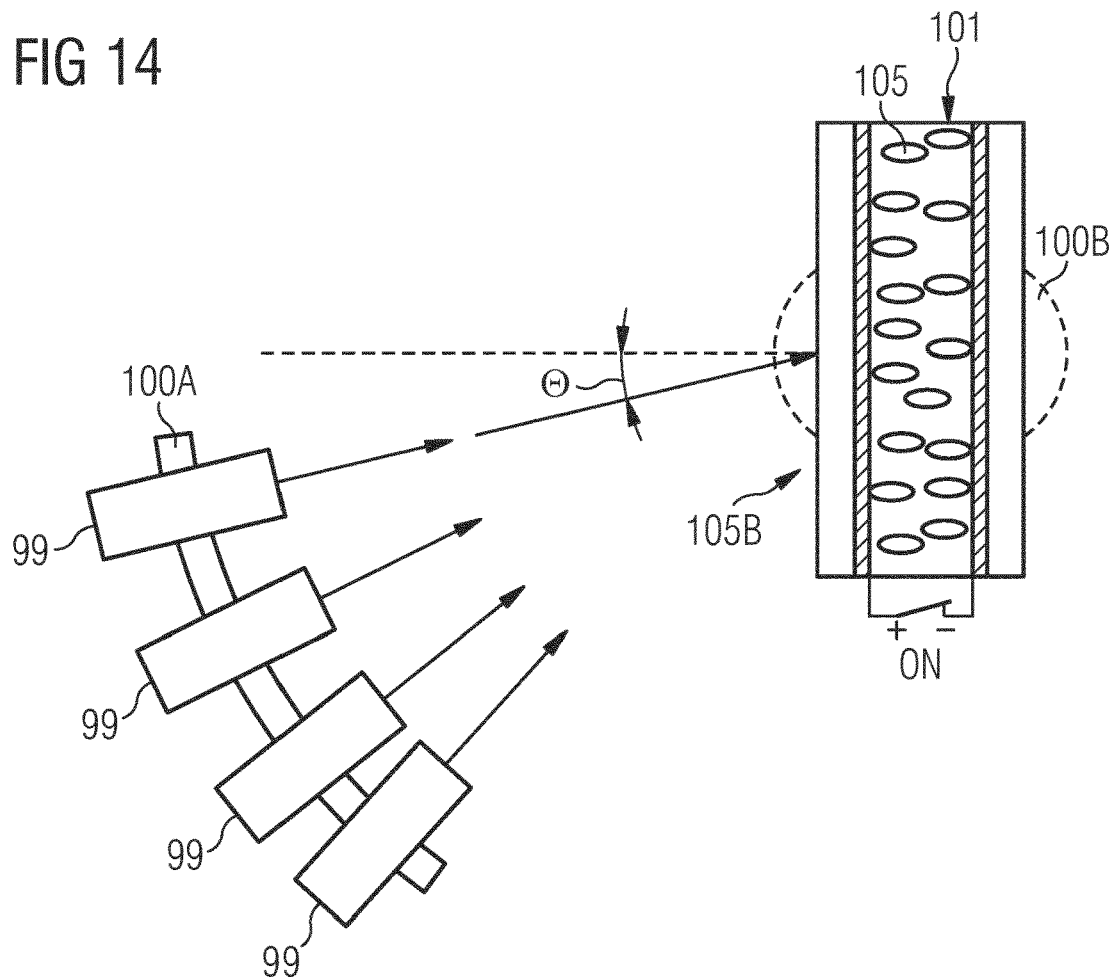
FIG. 14 is a schematic illustration of operating a lighting system with a movable source for chromatically tuning the light interaction with aligned asymmetrically shaped scatterers.

FIG. 14 illustrates an embodiment similar to FIG. 11. Changing the position/orientation of light source 99 causes different incidence angles onto the aligned elongated particles 105 being in the ON state 105B. As a result, different effective sizes contribute to the scattering and the total scattering cross section varies and the transmittance can, thus, be tuned. As disclosed in connection with FIG. 11, "change in the incidence direction" mounting systems can be provided to enable the change of incidence direction onto diffuser unit 101.

In the exemplary embodiment illustrated in FIG. 14, the ensemble scattering cross-section amount is minimal for orthogonal incidence and will increase with increasing incidence angle θ. Thus, like in nature for a lower standing sun, the scattering activity increases, i.e. the transmittance of diffuser unit 101 decreases increasingly for shorter wavelength, resulting in a more reddish sun for tilted incidence as in comparison with orthogonal incidence.

The optical features of the herein disclosed diffuser unit are in the following defined in connection with the E standard illuminant. Herein, as defined in the Standard Terminology of Appearance, ASTM international, E 284-09a, a spectral power distribution, SPD specifies an illuminant by the spectral composition of a radiometric quantity, such as radiance or radiant flux, as a function of wavelength. The E standard illuminant is an equal-energy radiator with a SPD that is constant inside the visible spectrum. The optical features are selected based on the various configuration and material parameters disclosed herein.

The herein disclosed diffuser units—when illuminated with white light as characterized by the E standard illuminant—transmit directed light that corresponds to a color point on the CIE 1976 u'-v'-chromaticity diagram with coordinates u', v' that are larger than 0.20 and 0.465, respectively, (line u'1/v'1 in FIG. 5D) for any configuration within the chromatic tenability range of the diffuser unit. Moreover, in some embodiments, the Euclidean distance $\Delta u'v'$ between the color point of the transmitted direct light and the Planckian locus satisfy $\Delta u'y'$ is smaller than 0.1 for any configuration within the chromatic tunability range. (Schematically, the Euclidean distance $\delta u'v'$ is indicated in FIG. 5D.) Moreover, the respective scattered light corresponds to a color point on the CIE 1976 u'-v'-chromaticity diagram with coordinates u', v' that are smaller than 0.20 and 0.465, respectively, (line u'1/v'1 in FIG. 5D) for any configuration within the chromatic tunability range of the diffuser unit. With respect to the distance between the color points associated to the scattered and transmitted light in the CIE 1976 u'-v'-chromaticity diagram, for any configuration within the chromatic tunability range of the diffuser unit, the Euclidean distance $\delta u'v'$ between these points satisfies $\delta u'v'$ is 0.02 or more (Schematically, the Euclidean distance $\delta'u'v'$ is indicated in FIG. 5A.)

In particular, in some embodiments, the color point for the transmitted direct light has coordinates u', v' that are larger than 0.20 and 0.465, respectively, for the maximum scattering cross-section associated with the tuning range of the respective embodiment (line u'1/v' in FIG. 5D). Moreover, in some embodiments, for the maximum scattering cross-section associated with the tuning range of the respective embodiment, the color point for the transmitted direct light has coordinates u', v' that are larger than 0.2117 and 0.4851, respectively, or larger than 0.2265 and 0.5029, respectively, (e.g. beyond lines u'2/v'2 in FIG. 5D), or larger than 0.243 and 0.5166, respectively, (e.g. beyond lines u'3/v'3 in FIG. 5D) or larger than 0.2598 and 0.5261, respectively.

Moreover, the Euclidean distance $\Delta u'v'$ between the color point of the transmitted direct light and the Planckian locus satisfy $\Delta u'v'$ is smaller than 0.1 for any configuration within the chromatic tunability range. Moreover, the respective scattered light corresponds to a color point on the CIE 1976 u'-v'-chromaticity diagram with coordinates u', v' that are smaller than 0.20 and 0.465, respectively, (line u'1/v'1 in FIG. 5D) for any configuration within the chromatic tunability range of the diffuser unit. With respect to the distance between the color points associated to the scattered and transmitted light in the CIE 1976 u'-v'-chromaticity diagram, for any configuration within the chromatic tunability range of the diffuser unit, the Euclidean distance $\delta u'v'$ between these points satisfies $\delta u'v'$ is 0.02 or more.

The herein disclosed embodiments allow creating a significant redshift in the transmitted light e.g. from CCTs in the range of 5500 K (white-yellow) to CCTs in the range of 4000 K (yellow/orange) to CCTs in the range of 3000 K (reddish sun) and even further. Such a redshift requires—assuming a thickness in the range from 10 μm to 500 μm, a filling ratio in the range from 30% to 70%, and an average particle size in the nano-range from 50 nm to 300 nm—a tuning capability in the refractive index, e.g. given by a maximum index mismatch or a maximum size variation.

In the following, the optical properties described herein are linked to specific material parameters that allow describing the generic concept for specific implementations of scattering layers that can be used in diffuser units for providing a chromatically tunable (for example, regular) transmitted light. In this context, it will be referred to FIGS. 5A to 5D and FIGS. 15 and 16. The tuning capability corresponds to a change in the transmittance of the diffuser unit that can be related to a specific color. This change in transmittance can be given for a light beam that does not change direction (e.g. tuning of individual scattering cross-section of nanodroplets by electric field changes) and/or can be achieved by a light beam's change in incident direction (e.g. tuning using the contributing anisotropic refractive index for aligned LCs in the nanodroplets or tuning using the contributing anisotropic shape of scattering elements).

Considering the case of Rayleigh scattering for isotropic particles, and assuming a constant, i.e. wavelength-independent, refractive index, and neglecting any absorption of light (or renormalizing the light absorption to reduce that added effect), it is possible to associate the points in the CIE 1976 color space u'1/v'1, u'2/v'2, u'3/v'3 given by the (above in connection with FIGS. 5C and 5D) mentioned u'- and v'-values 0.212/0.485, 0.225/0.5, and 0.24/0.514 to values of a regular spectral transmittance, assuming a standard illuminant E and a CIE 1931 standard observer (2°). In general, the regular spectral transmittance $T(\lambda)$ is a function of the wavelength and can be measured in accordance with the NIST (National Institute of Standards and Technology) Special Publication 250-69 of the U.S. Department of Commerce Technology Administration.

The transition between a regular spectral transmittance and its associated color point on the CIE 1976 color space is a well-known procedure. For example, reference is made to the standard ASTM E 308-01, which defines the procedure for obtaining the color point given a standard illuminant and a standard observer. As a consequence, any and all the features of the diffuser unit described in terms of the color (expressed in CIE 1976 color coordinates) of the regular transmitted light (for illumination by a non-polarized E standard illuminant and CIE 1931 standard observer)(2°) can be equivalently described in terms of the CIE 1976 color coordinates associate to the regular spectral transmittance of the diffuser unit, the mapping into the same color space being performed in accordance with the procedure described in the mentioned standard practice ASTM E308-01.

For example, the regular spectral transmittance at a wavelength of 450 nm—herein referred to as T(450 nm)—for the color point u'1/v'1 relates to T1(450 nm)=0.748, for the color point u'2/v'2 to T2(450 nm)=0.437, and for the color point u'3/v'3 to T3(450 nm)=0.200.

The transmittance allows a microscopic definition. Microscopically, the regular spectral transmittance $T(\lambda)$ is a function of the scattering cross-section $\sigma$ of the nanoscale scattering elements and the number of nanoscale scattering elements per unit area N, which is the product of the (three-dimensional) number density and the layer thickness. The regular spectral transmittance $T(\lambda)$ is given by $$T(\lambda) = e^{-\sigma(\lambda, n_h, m, d) \cdot N}$$

Therein, the Rayleigh scattering cross section $\sigma$ is—as given above—

$$\sigma(\lambda) = \frac{2}{3} \pi^5 \frac{D^6}{n_h^4 \lambda^4} \left( \frac{m^2 - 1}{m^2 + 2} \right)^2$$

with the refractive index of the host material $n_h$, effective particle diameter $D = d \, n_h$, and the relative refractive index m.

Considering the regular spectral transmittance T(450 nm) and the two equations above, for 450 nm, the number of nanoscale scattering elements per unit area N is given by $$N = c \cdot \frac{n_h^2}{D^6} \left( \frac{m^2 + 2}{m^2 - 1} \right)^2$$

where for a fixed value of T, the constant c is given by $$c = \ln\left( \frac{1}{T(450 \text{ nm})} \right) \cdot \frac{3}{2\pi^5} \cdot (450 \text{ nm})^4$$

From those equations, the relation between N and T is clear. In particular, it is possible to associate the number N of nanoscale scattering elements per unit area to a value of T(450 nm) and then to a u'-v'-point as a function of material features such as d, $n_h$ and m.

Specifically, for the color point u'1/v'1, the number N1 of nanoscale scattering elements per unit area is $$N_1 = 5.836 \times 10^7 \text{ nm}^4 \cdot \frac{n_h^2}{D^6} \left( \frac{\tilde{m}^2 + 2}{\tilde{m}^2 - 1} \right)^2$$

with constant c1_transmission=2×2.918×10$^7$ nm$^4$.

For the color point u'2/v'2, the number N2 of nanoscale scattering elements per unit area is $$N_2 = 1.664 \times 10^8 \text{ nm}^4 \cdot \frac{n_h^2}{D^6} \left( \frac{\tilde{m}^2 + 2}{\tilde{m}^2 - 1} \right)^2$$

with constant c2_transmission=2×8.32×10$^7$ nm$^4$.

For the color point u'3/v'3 points, the number N3 of nanoscale scattering elements per unit area is $$N_3 = 3.235 \times 10^8 \text{ nm}^4 \cdot \frac{n_h^2}{D^6} \left( \frac{\tilde{m}^2 + 2}{\tilde{m}^2 - 1} \right)^2$$

with constant c3_transmission=2×1.6175×10$^8$ nm$^4$.

At this stage it is noted—with reference to the two classes of configurations shown in FIGS. 10A and 10B—that the optical activity of a scattering layer can be doubled if used in the reflective configuration. Therefore, to achieve the same chromatic effect in reflection mode (FIG. 10B) only half of the number of nanoscale scattering elements per unit area is needed that is required in transmission mode (FIG. 10A). The values identified above for the constant c were derived for the transmission mode (c_transmission) such that in reflection mode, the half of those values apply to c_reflection. Accordingly, c_transmission equals 2×c_reflection, such that a factor of two "2" separated from the above values.

Based on the constants c_transmission (c_reflection), for a specific host material with refractive index $n_h$, the individual number of nanoscale scattering elements per unit area is a function of the parameters D and $\tilde{m}$, which have to be chosen to reach the final (desired chromatic) effect.

Referring to the above identified values/color points, the associated (optically) effective number $\tilde{N}$ of nanoscale scattering elements per unit area is $\tilde{N} \geq N_1$, such as $\tilde{N} \geq N_2$, such as $\tilde{N} \geq N_3$, wherein $\tilde{N} = N$ if the diffused unit does not comprise a reflective layer or a reflective sheet side and wherein $$\tilde{N} \equiv \frac{N}{2}$$

if the diffused unit comprises a reflective layer or a reflective sheet.

For example, the number N of nanoscale scattering elements per unit area associated to a specific color point in the u'-v'-chromaticity diagram can be determined for LC nanodroplets embedded in a polymeric matrix with parameters in the following range:

$0.02 \leq |n_e - n_o| \leq 0.5$ d being in the range from about 10 nm to about 500 nm
such as in the range from about 20 nm to about 400 nm
such as in the range from about 30 nm to about 300 nm $n_h$ being in the range from 1 to 3 such as in the range from 1.2 to 2.2 such as in the range from 1.25 to 1.75

$\tilde{m}$ being the one among the two values $$\frac{n_o}{n_h} \text{ and } \frac{n_e}{n_h}$$

which maximizes the function $$\left(\frac{m^2-1}{m^2+2}\right)^2$$

the minimum number N of nanodroplets per unit area of the scattering layer, in particular of the surface of the scattering layer, by $$N = c \cdot \frac{n_h^2}{D^6}\left(\frac{\tilde{m}^2+2}{\tilde{m}^2-1}\right)^2$$

and c being a respectively selected constant

Similarly, in the inverted concept, in which static scattering centers (nanoparticles) are embedded in a LC-based host material, the number N of nanoscale scattering elements per unit area associated to a specific color point in the u'-v'-chromaticity diagram can be determined with parameters in the following range:

$n_h$ (refractive index of the LC host material) where $0.02 \le |n_e - n_o| \le 0.5$ d of the nanoscale scattering elements being in the range from about 10 nm to about 500 nm such as in the range from about 20 nm to about 400 nm such as in the range from about 30 nm to about 300 nm np (refractive index of the static scattering center) being in the range from 1 to 3 such as in the range from 1.1 to 3.2 such as in the range from 1.2 to 3 such as in the range from 1.3 to 2.8 a maximizing refractive index of the liquid crystal host material $\widetilde{n_h}$ having a value between $n_o$ and $n_e$ wherein the liquid crystals have an anisotropy in the range of $0.02 \le |n_e - n_o| \le 0.5$, wherein $\widetilde{n_h}$ is the value, which maximizes the function $$\frac{1}{n_h^2}\left(\frac{m^2-1}{m^2+2}\right)^2$$

the minimum number N of static scattering centers per unit area of the scattering layer, in particular of the surface of the scattering layer, given by $$N = c \cdot \frac{\widetilde{n_h}^2}{D^6}\left(\frac{\hat{m}^2+2}{\hat{m}^2-1}\right)^2$$

wherein $$\hat{m} = \frac{n_p}{\widetilde{n_h}}$$

and c being a respectively selected constant.

Moreover, in the case of nanoscale scattering elements having an anisotropy in the geometric shape, the number N of nanoscale scattering elements per unit area associated to a specific color point in the u'-v'-chromaticity diagram can be determined with parameters in the following range:

$\tilde{D} = \tilde{d} \cdot n_h$ where $\tilde{d}$ being the long axis of the anisotropic elements and being in the range from about 10 nm to about 500 nm such as in the range from about 20 nm to about 400 nm such as in the range from about 30 nm to about 300 nm aspect ratio (ratio between long and short axis) larger than 1.2 such as 2 such as 5 such as 10 such as 23 or more np (refractive index of the static scattering center) in the range from 1.2 to 3.2 such as in the range from 1.3 to 3 such as in the range from 1.4 to 2.8 nh is in the range from 1 to 3 such as in the range from 1.2 to 2.2 such as in the range from 1.25 to 1.75 the minimum number N of anisotropic shaped nanoscale scattering elements per unit area of the scattering layer given by $$N = c \cdot \frac{n_h^2}{\tilde{D}^6}\left(\frac{m^2+2}{m^2-1}\right)^2$$

and c being a respectively selected constant

Figure 15:
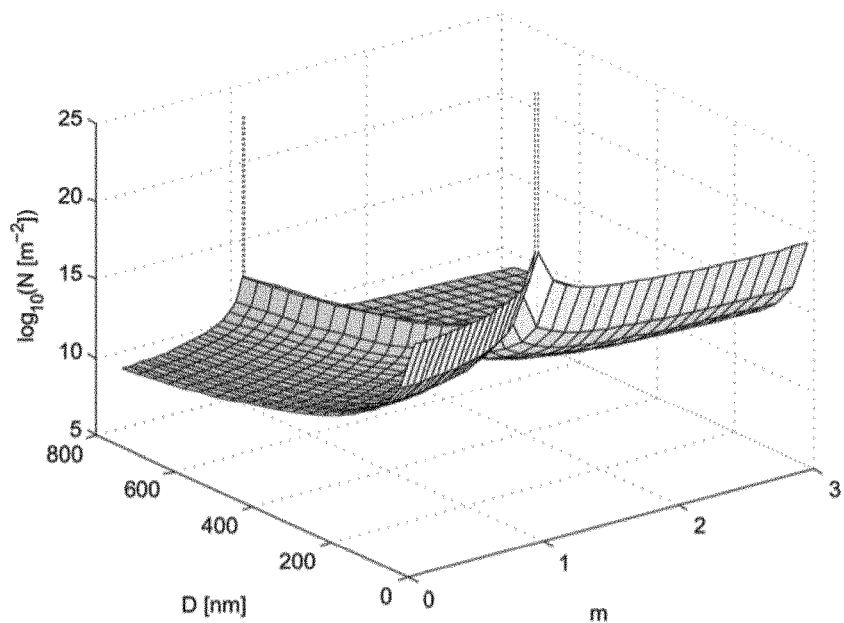
FIG. 15 is an exemplary three-dimensional graph of the minimum number N of nanoscale scattering elements per unit area.

In FIG. 15, a three-dimensional graph of the function log 10(N), with N in units m^−2, is shown as a function of D and m, assuming a host material of nh=1.5396 (corresponding exemplarily to NOA65 as a host material), calculated for a wavelength of 450 nm and using the approximation of a Rayleigh scattering formula for a regular spectral transmittance of T=0.748 at wavelength 450 nm.

As shown in FIG. 15, there is an increase in the number of needed nanoscale scattering elements for decreasing D, which is in particular significant for small particles. Moreover, in FIG. 15, there is a divergence approaching the plane at m=1 because for m=1, the scattering cross section sigma goes to 0 (corresponding to the transmission mode discussed above e.g. in connection with FIG. 3).

Any parameter constellation resulting in values on or above the surface will relate to color points on color point u'1/v'1 or having u'- and/or v'-values larger than or equal to u'1 and v'1. Similar surfaces can be determined for e.g. color point u'2/v'2 (T2(450 nm)=0.437), and for the color point u'3/v'3 (T3(450 nm)=0.200).

Figure 16:
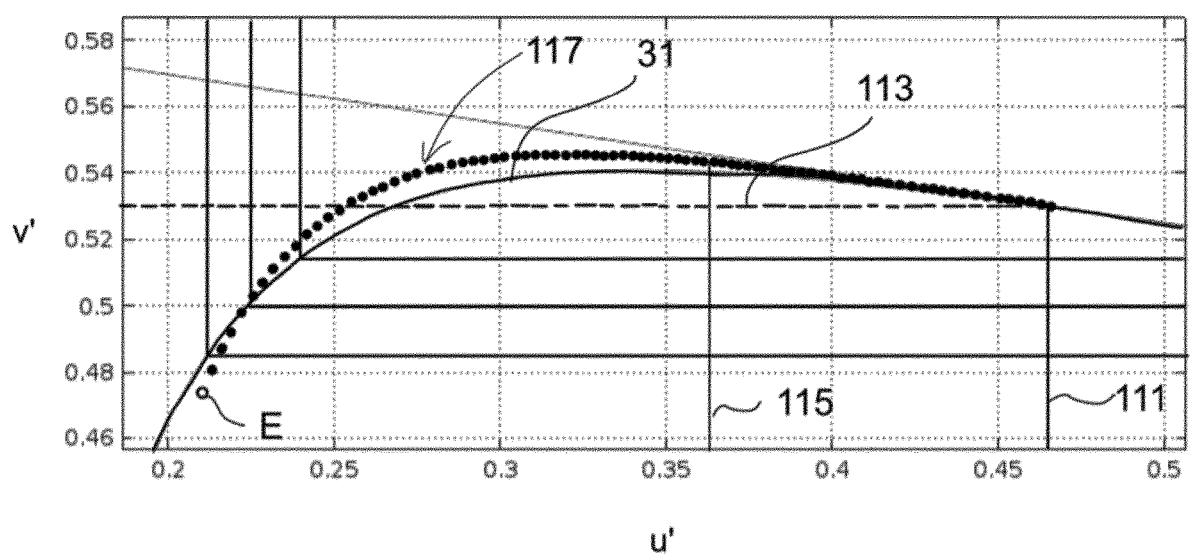
FIG. 16 shows a schematic uniform chromaticity diagram for illustrating upper values for the number N of nanoscale scattering elements per unit area.

Referring to FIG. 16 and dichroic illumination, ensuring proper sun-like illumination with e.g. a dark red sun, upper limits for the number N of nanoscale scattering elements per unit area can be determined. Similarly, respective lower limits for the regular spectral as well as total transmittance can be derived. Specifically, a regular spectral transmittance corresponding to a u' value of 0.465 (line 111 in FIG. 16), assuming a host material of nh=1.5396 (corresponding exemplarily to NOA65 as a host material, calculated for a wavelength of 450 nm and using the approximation of a Rayleigh scattering formula), (note that limiting v' would exclude a part of the Planckian locus 31 as indicated by dashed line 113 in FIG. 16) features transmittances of T(450 nm)=5.410×10⁻⁸, T(650 nm)=0.02. The resulting constant c, which is related to that N(max) value, is equal to 3.363×10⁹ nm⁴.

Assuming a u'-value of 0.3605 (line 115 in FIG. 16), there result transmittances of T(450 nm)=2.724×10⁻⁴, T(650 nm)=0.150. The respective resulting constant c, which is related to that N(max) value, is equal to 1.6499×10⁹ nm⁴.

In addition, a dotted line 117 of color points is indicated in FIG. 16, illustrating the tuning of a the color of the regularly transmitted light and respectively, the associated change in transmittance. For completeness, also the u'-v'-values for the three above discussed color points are shown.

In other words, the herein disclosed diffuser units represent a material composition that can be switched between diffusing states such as from a high transparency state to a high diffusing state. The diffuser unit is additionally a chromatically selective filter that diffuses light with a frequency dependence without reducing the clarity of the perceived image.

In some embodiments, multiple areal electric contact regions may be provided across, in particular large area a scattering unit. Each electric contact region may allow setting a desired electric field by applying a respective voltage across respective areal electric contacts. If, for example, features of the direct light vary across the illuminated scattering unit (such as the incident angle, the radiant flux or the spectrum), the respective selected voltage parameters can be adapted accordingly. Moreover, different regions may be controlled e.g. to provide a variation in the color across the scatterer unit.

As used herein, directed, direct, and (regularly) transmitted light may—depending on the context—be equivalent in meaning. Moreover, the transparency of the areal electrical contact in the visible wavelength range is preferably at least 80%, in particular at least 90% such as even 95% or 99% or more.

It will further be understood herein that in particular for a uniform appearance, in some embodiments, the nanoscale scattering elements are (essentially) randomly distributed in the host material. Thereby, interference phenomena may be avoided that can occur in the light scattering process. In fact this interference effect typically may lead to a dependence of the scattered color on the angle and thereby may produce an unrealistic appearance in the sky scenery. Specifically, the aspect of random distribution of the scattering elements illustrates the difference with respect to systems that provide spectrally tunable transmitted and scattered light by means of an ordered distribution of scatterers, such as tunable artificial opals or tunable photonic crystals. In other words, in the embodiments herein disclosed, the sample structure factor S(q) does not exhibit Bragg peaks for the nanoscale scattering elements.

Although the preferred embodiments of this invention have been described herein, improvements and modifications may be incorporated without departing from the scope of the following claims.

The invention claimed is:

1. A diffuser unit for providing a chromatically tunable transmitted light by scattering of light that is incident on the diffuser unit by illumination with directed white light, the diffuser unit comprising:
   a scattering layer comprising
      a plurality of transparent nanoscale scattering elements and
      a host material separating the nanoscale scattering elements; and
   a pair of areal electrical contacts configured to provide an electric field, wherein the areal electrical contacts extend on opposite faces of the scattering layer and at least one of the areal electrical contacts is configured to be transparent in the visible wavelength range,
   wherein the scattering layer has a wavelength dependent ensemble light scattering cross-section amount ($\sigma_{total}$) within the visible wavelength range that depends on
      a relative refractive index between the nanoscale scattering elements and the host material associated to an illumination direction, and
      an effective size of the nanoscale scattering elements associated to the illumination direction, and
   wherein the scattering layer is configured to be adaptable in the ensemble light scattering cross-section amount ($\sigma_{total}$) by varying at least one of the relative refractive index and the effective size of the nanoscale scattering elements, thereby providing a changeability in the spectrum of the transmitted light.

2. The diffuser unit of claim 1, wherein
   the scattering layer has a chromatic tunability range defined by at least one of the range of variation in the refractive index mismatch and the range of variation in the effective size of the nanoscale scattering elements, and
   the scattering layer is configured to provide ensemble light scattering cross-section amounts ($\sigma_{total}$) within the chromatic tunability range such that, for a CIE 1931 standard observer (2°), at least one of the spectrum of the regularly transmitted light and the regular spectral transmittance corresponds to a color point ($ON_{SUN}$, $OFF_{SUN}$) in the CIE 1976 u'-v'-chromaticity diagram with u'-v'-coordinates larger than 0.20 and 0.465, respectively, when non-polarized white light with a spectral power distribution that is constant inside the visible spectrum (E standard illuminant) impinges with an incidence angle onto the scattering layer for normal incidence or for a selected one or for all incidence angles within the angular range from normal incidence up to an incidence angle of about 20°, 40°, or 60°, or in the angular range from 30° to 50°.

3. The diffuser unit of claim 2, wherein the Euclidean distance $\Delta u'v'$ between at least one color point ($ON_{SUN}$, $OFF_{SUN}$), which is associated to the spectrum of the regularly transmitted light or the regular spectral transmittance within the chromatic tunability range, and the Planckian locus is equal to or smaller than at least one of 0.1, 0.08, 0.05, 0.03, and 0.01.

4. The diffuser unit of claim 1, wherein
   the scattering layer has a chromatic tunability range defined by at least one of the range of variation in the refractive index mismatch and the range of variation in the effective size of the nanoscale scattering elements, and
   the scattering layer is configured to provide ensemble light scattering cross-section amounts ($\sigma_{total}$) within the chromatic tunability range such that, for impinging white light with a spectral power distribution that is constant inside the visible spectrum (E standard illuminant), the spectrum of the diffuse light, integrated over all the scattering angles except those angles that depart by less than 20° from the regular transmission angle, corresponds to a color point ($ON_{SKY}$, $OFF_{SKY}$) in the CIE 1976 u'-v'-chromaticity diagram with u'-v'-coordinates smaller than 0.22 and 0.485, respectively.

5. The diffuser unit of claim 1, wherein
   the scattering layer has a chromatic tunability range defined by at least one of the range of variation in the refractive index mismatch and the range of variation in the effective size of the nanoscale scattering elements, and
   the scattering layer is configured to provide ensemble light scattering cross-section amounts ($\sigma_{total}$) within the chromatic tunability range such that, for impinging white light with a spectral power distribution that is constant inside the visible spectrum (E standard illuminant) and for a CIE 1931 standard observer (2°), the Euclidean distance Δu'v' between a color point (ON$_{SUN}$, OFF$_{SUN}$), which is associated to at least one of the spectra of the regularly transmitted light within the chromatic tunability range, and the regular spectral transmittance within the chromatic tunability range, and a color point (ON$_{SKY}$, OFF$_{SKY}$), which is associated to the respective spectra of the diffuse light, is equal to or greater than at least one of 0.02, 0.03, 0.04, and 0.05.

6. The diffuser unit of claim 1, wherein
the scattering layer has a chromatic tunability range defined by the range of variation in the refractive index mismatch and/or the range of variation in the effective size of the nanoscale scattering elements, and,
for the configuration within the chromatic tunability range, which corresponds to the maximum ensemble scattering cross-section amount ($\sigma_{total}$), for a CIE 1931 standard observer) (2°), the regularly transmitted light and/or the regular spectral transmittance corresponds to a color point (10, 20, . . . 60) in the CIE 1976 u'-v'-chromaticity diagram with u'-v'-coordinates greater than 0.20 and 0.465, respectively, or greater than at least one of 0.2117 and 0.4851, respectively, 0.212 and 0.485, respectively, 0.225 and 0.5, respectively, 0.2265 and 0.5029, respectively, 0.24 and 0.514, respectively, 0.243 and 0.5166, respectively, and 0.2598 and 0.5261, respectively, when non-polarized white light with a spectral power distribution that is constant inside the visible spectrum (E standard illuminant) impinges with an incidence angle onto the scattering layer in the range from normal incidence up to an incidence angle of about 60°.

7. The diffuser unit of claim 1, wherein
the wavelength dependent ensemble light scattering cross-section amount ($\sigma_{total}$) is given by a specific selection of properties of the scattering layer, which affect its optical properties, including at least one of:
at least one of a refractive index of the nanoscale scattering elements, an anisotropy in the refractive index, and a refractive index of constituting matter of the nanoscale scattering elements,
at least one of a size of the nanoscale scattering elements, a shape of the nanoscale scattering elements, and an anisotropy in the geometric shape of the nanoscale scattering elements,
at least one of a refractive index of the host material, an anisotropy in the refractive index, and a refractive index of constituting matter of the host material,
a volume fraction between the nanoscale scattering elements and the host material, and
a layer thickness of the scattering layer.

8. The diffuser unit of claim 1, wherein at least one of:
a mean size of the nanoscale scattering elements is in the range from about 10 nm to about 500 nm, in the range from about 20 nm to about 400 nm, or in the range from about 30 nm to about 300 nm,
a volume fraction between the nanoscale scattering elements and the host material is in the range from about 30% to about 70% or in the range from about 40% to about 60%,
a layer thickness of the scattering layer is in the range from about 10 μm to about 500 μm or in the range from about 20 μm to about 350 μm,
a layer thickness is defined by spacer elements, and
a layer thickness has a variation in thickness less than 10% across an area of 10 cm×10 cm of the scattering layer.

9. The diffuser unit of claim 1,
wherein the wavelength dependent ensemble light scattering cross-section amount ($\sigma_{total}$) in a blue wavelength interval from 440 nm to 460 nm is larger than in a yellow wavelength interval from 540 nm to 560 nm or is at least about 15% or at least about 30% larger, and the wavelength dependent ensemble light scattering cross-section amount ($\sigma_{total}$) in the yellow wavelength interval from 540 nm to 560 nm is larger than in a red wavelength interval from 640 nm to 660 nm or is at least about 10% or at least about 20% larger, and
wherein the wavelength dependent ensemble light scattering cross-section amount a ($\sigma_{total}$) decreases with increasing the wavelength.

10. The diffuser unit of claim 1, further comprising at least one of:
a reflective layer,
a reflective sheet side,
a UV or IR absorbing/protection layer,
a wavelength independent diffusing layer, and
a transparent conducting oxide layer providing one of the areal electrical contacts.

11. A diffuser unit for providing a chromatically tunable scattering interaction onto impinging white light, the diffuser unit comprising:
a polymer dispersed liquid crystal layer with liquid crystals embedded in a host polymer, wherein the liquid crystals form nanodroplets, are separated by the polymer, and have an anisotropy in the index of refraction; and
a pair of areal electrical contacts configured to provide an electric field configured to interact with the liquid crystals within the nanodroplets, wherein the areal electrical contacts extend on opposite faces of the scattering layer and at least one of the areal electrical contacts is configured to be transparent in the visible wavelength range.

12. A diffuser unit for providing a chromatically tunable transmitted light by scattering of light that is incident on the diffuser unit by illumination with directed white light, the diffuser unit comprising:
a scattering layer comprising a polymeric dispersed liquid crystal layer with
a plurality of nanoscale scattering elements formed by liquid crystals being delimited in nanodroplets with a droplet diameter d in the range from about 10 nm to about 500 nm or in the range from about 20 nm to about 400 nm or in the range from about 30 nm to about 300 nm,
the liquid crystals having an anisotropy in the range of $0.02 \leq |n_e - n_o| \leq 0.5$, and
a polymeric host material separating the nanoscale scattering elements and having a host refractive index $n_h$ in the range from 1 to 3 or in the range from 1.2 to 2.2 or in the range from 1.25 to 1.75; and
wherein the maximizing relative refractive index $\tilde{m}$ is the one among the two values $$\frac{n_o}{n_h} \text{ and } \frac{n_e}{n_h},$$

which maximizes the function $$\left(\frac{m^2-1}{m^2+2}\right)^2,$$

and
wherein the droplet size, the host refractive index, and the maximizing relative refractive index, and a constant c define the minimum number N of nanodroplets per unit area of the scattering layer, by $$N = c \cdot \frac{n_h^2}{D^6} \left( \frac{\tilde{m}^2 + 2}{\tilde{m}^2 - 1} \right)^2,$$

for the constant c being at least one of
2.918×10⁷ nm⁴ or larger,
8.32×10⁷ nm⁴ or larger, and
1.6175×10⁸ nm⁴ or larger; and
a pair of areal electrical contacts configured to provide an electric field configured to interact with the liquid crystals being delimited in the nanodroplets, wherein the areal electrical contacts extend on opposite faces of the scattering layer and at least one of the areal electrical contacts is configured to be transparent in the visible wavelength range,
wherein the scattering layer has a wavelength dependent ensemble light scattering cross-section amount ($\sigma_{total}$) within the visible wavelength range that depends on
a relative refractive index between the nanodroplets and the host polymeric host material associated to an illumination direction, and
an effective size of the nanodroplets associated to the illumination direction, and
wherein the scattering layer is configured to be adaptable in the ensemble light scattering cross-section amount ($\sigma_{total}$) by varying the relative refractive index, thereby providing a changeability in the spectrum of the transmitted light.

13. The diffuser unit of claim 12,
wherein the constant c is
equal to or smaller than 3.363×10⁹ nm⁴,
equal to or smaller than 2.5×10⁹ nm⁴, or
equal to or smaller than 1.6499×10⁹ nm⁴.

14. A diffuser unit for providing a chromatically tunable transmitted light by scattering of light that is incident on the diffuser unit by illumination with directed white light, the diffuser unit comprising:
a scattering layer comprising static scattering centers as a plurality of nanoparticles that are embedded in a liquid crystal-based host material with
the static scattering centers having a diameter d in the range from about 10 nm to about 500 nm or in the range from about 20 nm to about 400 nm or in the range from about 30 nm to about 300 nm,
a refractive index $n_p$ of the static scattering centers being in the range from 1.1 to 3.2 in the range from 1.2 to 3 in the range from 1.3 to 2.8, and
a maximizing refractive index of the liquid crystal host material $\tilde{n}_h$ having a value between $n_o$ and $n_e$ wherein the liquid crystals have an anisotropy in the range of $0.02 \leq |n_e - n_o| \leq 0.5$; and
wherein $\tilde{n}_h$ is the value, which maximizes the function $$\frac{1}{n_h^2} \left( \frac{m^2 - 1}{m^2 + 2} \right)^2,$$

and wherein the size of the static scattering centers, the maximizing host refractive index, the static scattering centers refractive index, and a constant c define the minimum number N of static scattering centers per unit area of the scattering layer of the surface of the scattering layer, by $$N = c \cdot \frac{\tilde{n}_h^2}{D^6} \left( \frac{\hat{m}^2 + 2}{\hat{m}^2 - 1} \right)^2$$

wherein $$\hat{m} = \frac{n_p}{\tilde{n}_h},$$

for the constant c being at least one of
2.918×10⁷ nm⁴ or larger,
8.32×10⁷ nm⁴ or larger,
1.6175×10⁸ nm⁴ or larger; and
a pair of areal electrical contacts configured to provide an electric field configured to interact with the liquid crystal-based host material, wherein the areal electrical contacts extend on opposite faces of the scattering layer and at least one of the areal electrical contacts is configured to be transparent in the visible wavelength range,
wherein the scattering layer has a wavelength dependent ensemble light scattering cross-section amount ($\sigma_{total}$) within the visible wavelength range that depends on
a relative refractive index between the nanoscale scattering elements and the liquid crystal-based host material associated to an illumination direction, and
an effective size of the nanoscale scattering elements associated to the illumination direction, and
wherein the scattering layer is configured to be adaptable in the ensemble light scattering cross-section amount ($\sigma_{total}$) by varying the relative refractive index, thereby providing a changeability in the spectrum of the transmitted light.

15. The diffuser unit of claim 14, further comprising:
a pair of cover sheets each carrying one of the areal electrical contacts and delimiting the liquid crystal layer.

16. A diffuser unit for providing a chromatically tunable transmitted light by scattering of light that is incident on the diffuser unit by illumination with directed white light, the diffuser unit comprising:
a scattering layer comprising transparent nanoscale scattering elements having an anisotropy in the geometric shape and being embedded in a host material, wherein an effective diameter $\tilde{D} = \tilde{d} \cdot n_h$, where $\tilde{d}$ is a long axis of each anisotropic shaped nanoscale scattering element and is in the range from about 10 nm to about 500 nm or in the range from about 20 nm to about 400 nm or in the range from about 30 nm to about 300 nm,
an aspect ratio (ratio between the long axis and a short axis for each anisotropic shaped nanoscale scattering element) is larger than at least one of 1.2, 2, 5, 10 and 23,
a refractive index of the anisotropic shaped nanoscale scattering elements is in the range from 1.2 to 3.2 or in the range from 1.3 to 3 or in the range from 1.4 to 2.8, and
a refractive index of the host material is in the range from 1 to 3 or in the range from 1.2 to 2.2 or in the range from 1.25 to 1.75, and wherein the parameters anisotropy/maximum size for long axis, host refractive index, relative refractive index, and a constant c define the minimum number N of anisotropic shaped nanoscale scattering elements per unit area of the scattering layer by $$N = c \cdot \frac{n_h^2}{\tilde{D}^6}\left(\frac{m^2+2}{m^2-1}\right)^2,$$

for the constant c being at least one of
  $2.918 \times 10^7$ nm$^4$ or larger,
  $8.32 \times 10^7$ nm$^4$ or larger,
  $1.6175 \times 10^8$ nm$^4$ or larger; and
a pair of areal electrical contacts configured to provide an electric field configured to interact with the anisotropic shaped nanoscale scattering elements, wherein the areal electrical contacts extend on opposite faces of the scattering layer and at least one of the areal electrical contacts is configured to be transparent in the visible wavelength range,
wherein the scattering layer has a wavelength dependent ensemble light scattering cross-section amount ($\sigma_{total}$) within the visible wavelength range that depends on
  a relative refractive index between the anisotropic shaped nanoscale scattering elements and the host material associated to an illumination direction, and
  an effective size of the anisotropic shaped nanoscale scattering elements associated to the illumination direction, and
wherein the scattering layer is configured to be adaptable in the ensemble light scattering cross-section amount ($\sigma_{total}$) by varying the effective size of the anisotropic shaped nanoscale scattering elements, thereby providing a changeability in the spectrum of the transmitted light.

17. The diffuser unit of claim 16, wherein:
the nanoscale scattering elements are at least one of geometrically asymmetric rod-shaped, and elongated in shape, and provide a dipole moment in the presence of an electric field,
the host material is a liquid-like host material layer, wherein the liquid-like host material differs in the refractive index from the refractive index of the nanoscale scattering elements, separates the nanoscale scattering elements, and allows reorientation of the nanoscale scattering element; and further comprising
a pair of cover sheets each carrying one of the areal electrical contacts and delimiting the liquid-like host material layer.

18. A lighting system for providing a chromatically tunable illumination of an ambience, the lighting system comprising:
a white light source configured to generate directed white light;
a scattering layer configured to be illuminated by the white light source, the scattering layer comprising a nanostructure of transparent nanoscale elements, the nanoscale elements having an anisotropy in at least one of the index of refraction and the geometrical shape; and
an electric field generator configured to generate an electrical field across the scattering layer,
wherein, in dependence of the electrical field generated by the electric field generator, the nanoscale elements cause different scattering conditions for the directed white light.

19. The lighting system of claim 18, wherein at least one of
the scattering layer is a part of a diffuser unit as recited in claim 1,
the electric field generator comprises a power unit that is electrically in contact with the pair of areal electrical contacts, and
the optical parameters of the scattering layer are selected such that without an applied electric field, the white light passing through the scattering layer is separated in a regularly transmitted light portion having a lower correlated color temperature and a diffused light portion having a higher correlated color temperature that is at least 1.1 times, 1.2 times, or 1.5 times more than the lower correlated color temperature.

20. The lighting system of claim 18, wherein
the electric field generator is configured to provide at least two differing operating states by setting at least one of the relative refractive index and the effective size of the nanoscale scattering elements with respect to an incidence direction of the directed white light of the white light source.

21. The lighting system of claim 18, further comprising at least one of
a control unit configured to control the strength of the electrical field generated by the electric field generator, thereby controlling the ensemble light scattering cross-section amount ($\sigma_{total}$);
a mount structure configured for at least one of:
  varying the angle of incidence of the directed white light onto the scattering layer,
  positioning the white light source with respect to the scattering layer, and
  orienting the scattering layer with respect to the white light source,
thereby providing a plurality of different incidence angles of the directed white light onto the scattering layer that result in scattering interactions that vary due to at least one of the anisotropy in the index of reflection and the effective size of the nanoscale scattering elements; and
a polarizer configured to change the polarization of the directed white light.

* * * * *